(12) United States Patent
Geaghan

(10) Patent No.: US 8,363,031 B2
(45) Date of Patent: Jan. 29, 2013

(54) MUTUAL CAPACITANCE MEASURING CIRCUITS AND METHODS

(75) Inventor: Bernard O. Geaghan, Salem, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 564 days.

(21) Appl. No.: 12/560,545

(22) Filed: Sep. 16, 2009

(65) Prior Publication Data

US 2010/0073323 A1 Mar. 25, 2010

Related U.S. Application Data

(60) Provisional application No. 61/099,650, filed on Sep. 24, 2008, provisional application No. 61/157,715, filed on Mar. 5, 2009, provisional application No. 61/187,050, filed on Jun. 15, 2009.

(51) Int. Cl.
 *G06F 3/045* (2006.01)

(52) U.S. Cl. ...... 345/174; 324/678; 324/679; 178/18.06

(58) Field of Classification Search .................. None
See application file for complete search history.

(56) References Cited

U.S. PATENT DOCUMENTS

| | | | |
|---|---|---|---|
| 3,732,369 A | 5/1973 | Cotter | |
| 4,071,691 A | 1/1978 | Pepper, Jr. | |
| 4,175,239 A | 11/1979 | Sandler | |
| 4,323,829 A | 4/1982 | Witney et al. | |
| 4,581,483 A | 4/1986 | Ralston | |
| 4,639,720 A | 1/1987 | Rympalski et al. | |
| 4,686,332 A | 8/1987 | Greanias et al. | |
| 5,006,952 A | 4/1991 | Thomas | |
| 5,189,417 A | 2/1993 | Caldwell et al. | |
| 5,305,017 A | 4/1994 | Gerpheide | |
| 5,349,353 A | 9/1994 | Zrilic | |
| 5,374,787 A | 12/1994 | Miller et al. | |
| 5,488,204 A | 1/1996 | Mead et al. | |
| 5,526,294 A | 6/1996 | Ono | |
| 5,572,205 A | 11/1996 | Caldwell et al. | |
| 5,730,165 A | 3/1998 | Philipp | |
| 5,790,106 A | 8/1998 | Hirano et al. | |
| 5,790,107 A | 8/1998 | Kasser | |
| 5,825,352 A | 10/1998 | Bisset et al. | |
| 5,861,583 A | 1/1999 | Schediwy et al. | |
| 5,867,111 A | 2/1999 | Caldwell et al. | |

(Continued)

FOREIGN PATENT DOCUMENTS

| | | |
|---|---|---|
| EP | 178157 | 4/1986 |
| FR | 2774497 | 8/1999 |

(Continued)

OTHER PUBLICATIONS

Analog Devices AD7142/AD7142-1, Rev. PrD, "Programmable Capicatance-to-Digital Converter with Environmental Compensation", 2005 Analog Devices, Inc., pp. 1-64.

(Continued)

*Primary Examiner* — Jason Olson
(74) *Attorney, Agent, or Firm* — Steven A. Bern

(57) ABSTRACT

An apparatus for measuring a parameter related to the capacitance between a drive electrode and a receive electrode of a touch sensitive device. The apparatus includes an accumulator capacitor coupled at one end to a voltage measurement circuit and at the other end to the receive electrode, and control circuitry configured and arranged, during each cycle of a measurement sequence, to connect a reference voltage to a first node that electrically connects the accumulator capacitor to the voltage measurement circuit. The apparatus further includes a resistive circuit configured and arranged to draw current from a second node electrically connected to the accumulator capacitor and to the receive electrode during the measurement sequence.

33 Claims, 12 Drawing Sheets

U.S. PATENT DOCUMENTS

| | | | |
|---|---|---|---|
| 5,920,309 | A | 7/1999 | Bisset et al. |
| 6,075,520 | A | 6/2000 | Inoue et al. |
| 6,239,389 | B1 | 5/2001 | Allen et al. |
| 6,452,514 | B1 | 9/2002 | Philipp |
| 6,466,036 | B1 * | 10/2002 | Philipp .................. 324/678 |
| 6,535,200 | B2 | 3/2003 | Philipp |
| 6,879,930 | B2 | 4/2005 | Sinclair |
| 6,885,365 | B1 | 4/2005 | Kang |
| 6,888,536 | B2 | 5/2005 | Westerman |
| 6,970,160 | B2 | 11/2005 | Mulligan et al. |
| 7,129,714 | B2 | 10/2006 | Baxter |
| 7,148,704 | B2 * | 12/2006 | Philipp .................. 324/686 |
| 7,265,746 | B2 | 9/2007 | Knowles |
| 7,274,353 | B2 | 9/2007 | Chiu et al. |
| 7,292,229 | B2 | 11/2007 | Morag et al. |
| 7,453,444 | B2 | 11/2008 | Geaghan |
| 7,830,157 | B2 | 11/2010 | Geaghan |
| 8,077,161 | B2 | 12/2011 | Kinoshita |
| 2001/0006369 | A1 | 7/2001 | Ely |
| 2003/0076306 | A1 | 4/2003 | Zadesky et al. |
| 2003/0122432 | A1 | 7/2003 | Caldwell |
| 2004/0004488 | A1 | 1/2004 | Baxter |
| 2004/0119701 | A1 | 6/2004 | Mulligan et al. |
| 2004/0178997 | A1 | 9/2004 | Gillespie et al. |
| 2005/0150697 | A1 | 7/2005 | Altman et al. |
| 2006/0012581 | A1 | 1/2006 | Haim |
| 2006/0022959 | A1 | 2/2006 | Geaghan |
| 2006/0092142 | A1 | 5/2006 | Gillespie et al. |
| 2006/0097991 | A1 | 5/2006 | Hotelling et al. |
| 2006/0232567 | A1 | 10/2006 | Westerman et al. |
| 2007/0074913 | A1 | 4/2007 | Geaghan et al. |
| 2007/0074915 | A1 | 4/2007 | Chung et al. |
| 2007/0084645 | A1 | 4/2007 | Chung et al. |
| 2007/0247172 | A1 | 10/2007 | Li |
| 2007/0257890 | A1 | 11/2007 | Hotelling et al. |
| 2007/0268272 | A1 | 11/2007 | Perski et al. |
| 2007/0285365 | A1 | 12/2007 | Lee |
| 2008/0004505 | A1 | 1/2008 | Kapit et al. |
| 2008/0006453 | A1 | 1/2008 | Hotelling |
| 2008/0078590 | A1 | 4/2008 | Sequine |
| 2008/0087477 | A1 | 4/2008 | Cho et al. |
| 2008/0106520 | A1 | 5/2008 | Free et al. |
| 2008/0142281 | A1 | 6/2008 | Geaghan |
| 2008/0158167 | A1 | 7/2008 | Hotelling et al. |
| 2008/0158169 | A1 | 7/2008 | O'Connor et al. |
| 2008/0158175 | A1 | 7/2008 | Hotelling |
| 2008/0162996 | A1 | 7/2008 | Krah et al. |
| 2008/0162997 | A1 | 7/2008 | Vu et al. |
| 2008/0165134 | A1 | 7/2008 | Krah |
| 2008/0251299 | A1 | 10/2008 | Liao et al. |
| 2008/0309625 | A1 | 12/2008 | Krah et al. |
| 2009/0009483 | A1 | 1/2009 | Hotelling et al. |
| 2009/0025987 | A1 | 1/2009 | Perski |
| 2009/0066670 | A1 | 3/2009 | Hotelling et al. |
| 2009/0096757 | A1 | 4/2009 | Hotelling et al. |
| 2009/0096758 | A1 | 4/2009 | Hotelling et al. |
| 2009/0194344 | A1 | 8/2009 | Harley et al. |
| 2009/0219258 | A1 | 9/2009 | Geaghan et al. |
| 2009/0244033 | A1 | 10/2009 | Westerman |
| 2009/0284495 | A1 | 11/2009 | Geaghan et al. |
| 2010/0033437 | A1 | 2/2010 | Matsubara |
| 2010/0073323 | A1 | 3/2010 | Geaghan |
| 2010/0149110 | A1 | 6/2010 | Gray |
| 2010/0188345 | A1 | 7/2010 | Keskin |
| 2010/0300773 | A1 | 12/2010 | Cordeiro et al. |
| 2011/0007021 | A1 | 1/2011 | Bernstein |
| 2011/0157080 | A1 | 6/2011 | Ciesla |

FOREIGN PATENT DOCUMENTS

| | | |
|---|---|---|
| GB | 2072389 | 9/1981 |
| JP | 2288122 | 11/1990 |
| JP | 11305932 | 11/1999 |
| JP | 2000/076014 | 3/2000 |
| JP | 2007/052639 | 3/2007 |
| JP | 2007-334690 | 12/2007 |
| JP | 2009-110418 | 5/2009 |
| JP | 2009/192306 | 8/2009 |
| KR | 10-0453971 | 10/2004 |
| WO | WO 2004/019258 A2 | 3/2004 |
| WO | WO 2004/040606 A2 | 5/2004 |
| WO | WO 2006/104745 A2 | 10/2006 |
| WO | WO 2007/017848 A2 | 2/2007 |
| WO | WO 2008/085720 A1 | 7/2008 |

OTHER PUBLICATIONS

Bao et al.; "DOA Estimation Under Unknown Mutual Coupling and Multipath", IEEE Transactions on Aerospace and Electronic Systems IEEE USA, vol. 41, No. 2, Apr. 2005, pp. 565-573.

Geaghan et al., "Low Cost Mutual Capacitance Measuring Circuits and Methods", Presented at SID Conference, Austin, TX, Jun. 3, 2009, 4 pages.

International Search Report, PCT/US2009/057114, International Filing Date: Sep. 16, 2009, 3 pages.

"Operational_Transconductance_Amplifier", Creative Commons Attribution-ShareALike [On-line], [updated on the internet Apr. 15, 2010], URL<http://en.wikipedia.org/wiki/Operational_transconductance_amplifer>.

QMatrix Data Sheet, Mutual Capacitance QT60486_104, 2003, Quantum Research Group, Ltd., pp. 1-30.

SID Conferance Presentation, "Low Cost Mutual Capacitance Measuring Circuit", 3M Touch Systems, San Antonio, Texas, 9 pages, © 2009.

U.S. Appl. No. 12/575,860, "Multi-touch Device with Multiple Drive Frequencies and Maximum Likelihood Estimation", filed Oct. 8, 2009.

U.S. Appl. No. 12/618,874, "Touch Sensitive Device Using Threshold Voltage Signal", filed Nov. 16, 2009.

U.S. Appl. No. 12/652,343, "High Speed Noise Tolerant Multi-touch Touch Device and Controller Therefor", filed Jan. 5, 2010.

U.S. Appl. No. 61/348,173, "High Speed Low Power Multi-Touch Device and Controller Therefor", filed May 25, 2010.

Written Opinion, for International Application PCT/US2009/057114, 4 pages, 2009.

* cited by examiner

MUTUAL CAPACITANCE MEASURING CIRCUITS AND METHODS

CROSS REFERENCE TO RELATED APPLICATIONS

This patent document claims the benefit, under 35 U.S.C. §119(e), of U.S. Provisional Patent Application Ser. No. 61/099,650 filed Sep. 24, 2008, entitled "Mutual Capacitance Measuring Circuits And Methods;" and U.S. Provisional Patent Application Ser. No. 61/157,715 filed Mar. 5, 2009, entitled "Mutual Capacitance Measuring Circuits And Methods;" and U.S. Provisional Patent Application Ser. No. 61/187,050 filed Jun. 15, 2009, entitled "Mutual Capacitance Measuring Circuits And Methods;" the disclosure of each of which is incorporated by reference in its entirety.

FIELD OF THE INVENTION

The present invention relates generally to capacitance measuring circuits and methods, and to systems such as capacitive touch sensing systems that utilize capacitance measuring circuits and methods.

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch sensitive device including, for example, resistive, infrared, capacitive, surface acoustic wave, electromagnetic, near field imaging, etc. Capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, their electric fields interact to form capacitance. In the case of a capacitive touch sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of the object as it is moved across the touch surface (such as location, pressure, direction, speed, acceleration, and so forth).

SUMMARY

One aspect of the present disclosure concerns a switched capacitor capacitive controller that measures mutual capacitance and/or capacitance to ground to determine touch locations, and methods of operating a controller to measure mutual capacitance, capacitance to ground, and/or ratios of capacitance.

The present disclosure is generally directed to capacitance measuring circuits that measure capacitance between electrodes and capacitance of electrodes to ground, in which the charging and discharging of capacitors can be performed using a series of switch-controlled cycles during which voltage signals are applied to at least one driven electrode, and the signals are measured on at least one measured electrode.

According to one embodiment, an apparatus is provided for measuring a parameter related to the capacitance between a drive electrode and a receive electrode of a touch sensitive device. The apparatus includes an accumulator capacitor coupled at one end to a voltage measurement circuit and at the other end to the receive electrode, and control circuitry configured and arranged, during each cycle of a measurement sequence, to connect a reference voltage to a first node that electrically connects the accumulator capacitor to the voltage measurement circuit. The apparatus further includes a resistive circuit configured and arranged to draw current from a second node electrically connected to the accumulator capacitor and to the receive electrode during the measurement sequence.

Some embodiments of the present disclosure are further related to measurements that are performed in a bipolar manner, that is, by measuring the capacitance between electrodes with current flowing from a first electrode P1 to a second electrode P2 and also with current flowing from second electrode P2 to first electrode P1. Certain embodiments employing bipolar measurements may reduce susceptibility to low frequency noise.

Some embodiments of the present disclosure are further related to measuring the number of voltage transition cycles required to accumulate charge to a level established by a comparator threshold. In accordance with some embodiments of the present invention, the switching and comparator functions can be accomplished using standard parallel input/output logic circuits, and the resistance and charge accumulation functions can be accomplished using low cost, readily obtained components.

In certain embodiments, the present disclosure also provides capacitance measuring circuits and methods that may apply voltages to switching elements that time-average to zero over an extended time, which can improve linearity of measurements and reduce sensitivity of measurements to parasitic capacitance.

In certain embodiments, the present disclosure also provides capacitance measuring circuits and methods that may apply voltages to electrodes that time-average to zero over an extended time.

In certain embodiments, the present disclosure also provides capacitance measuring circuits and methods that may apply simultaneous voltages of different phase to multiple driven electrodes, and measure differences in capacitance between two or more driven electrodes and one or more receiver electrodes.

In certain embodiments, the present disclosure also provides capacitance measuring circuits and methods that may apply voltage to two or more electrodes of a first array and measure changes in capacitance among two or more electrodes of a second array, then resolve touched electrodes of the second array, then apply voltage sequentially to touched electrodes of the second array and measure differences in capacitance among two or more electrodes of a first array, thereby resolving touch locations at all intersections of the first array and the second array in a minimum number of measurements.

As such, the present disclosure can provide enhanced capacitance measuring circuits at a low cost and that are easily integrated into standard logic circuits, microprocessors, gate arrays, or application specific integrated controllers (ASICs).

BRIEF DESCRIPTION OF THE DRAWINGS

The present disclosure may be more completely understood and appreciated in consideration of the following detailed description of various embodiments in connection with the accompanying drawings, in which.

Figure 1:
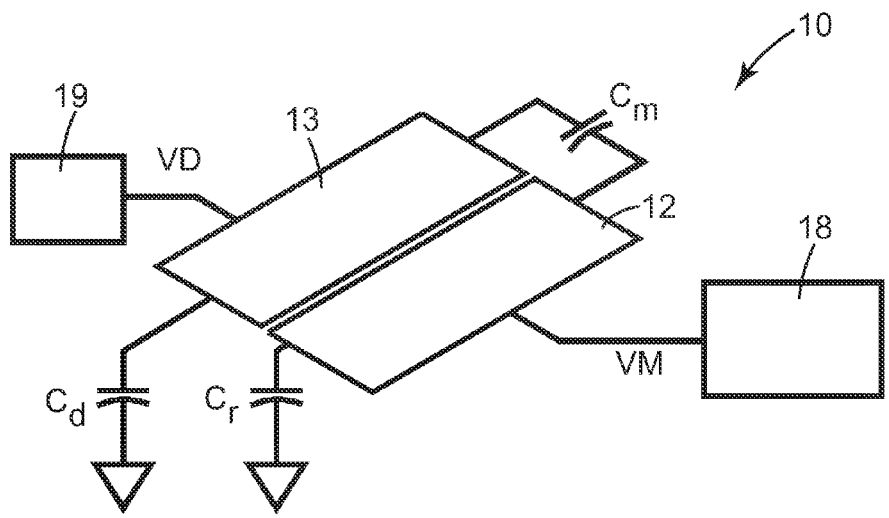
FIG. 1 is a circuit for measuring mutual capacitance between two electrodes in proximity.

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

DETAILED DESCRIPTION

Aspects of the present disclosure are generally directed to capacitance measuring circuits that measure capacitance between electrodes and capacitance of electrodes to ground, in which the charging and discharging of capacitors are performed using a series of switch-controlled cycles during which voltage signals are applied to at least one driven electrode, and the signals are measured on at least one measured electrode.

It is readily understood by those of ordinary skill in the art that, with the rapid changes in computer and chip technology, all values for information density, storage capacity, speed, rates of data transmission, number of ports, bit size, etc., are merely exemplary based upon commercially available equipment as of the time that these embodiments were described. Advances in the properties and formats of computers, chips, hardware and software are anticipated, and these improvements are expected to be used in the underlying practice of the present invention. Drawings and graphs are for illustration of the disclosure and are not to scale. Switches are break-before-make. In the following description of the illustrated embodiments, the following definitions are used consistently within this patent.

A touch is near proximity of a conductive element which may be a finger, metal object, stylus, or other conductive material. Finger(s) or conductive object(s) used in a touch are connected to ground by a capacitance and/or resistance (typically hundreds to thousands of picofarads) unless otherwise stated.

Electrode is an electrically conductive object that may be activated with electrical signals, resulting in electric fields that are sensitive to proximity of a touch.

IO or I/O means Input/Output, such as an I/O device which is a device capable of receiving input electrical signals and sending output electrical signals.

↑ represents the transition of an electrical signal from a voltage to a more positive voltage.

↓ represents the transition of an electrical signal from a voltage to a more negative voltage.

ADC or A/D converter is a device that converts an electrical signal to a digital form ("analog/digital converter"). For example, a voltage may be converted to a binary number that represents the voltage. ADC methods include successive approximation, timed slope converters, dual slope converters, sigma-delta converters, voltage comparators including logic gates, and other methods known in the art.

DAC or D/A converter is a device that converts a digital value to an electrical signal ("digital/analog converter"). For example, a 16 byte binary number may be converted to an analog voltage.

Ground (Gnd) refers to a common electrical reference point which may be at the voltage of earth ground, or may be a local common voltage.

Mutual capacitance (Cm) is the capacitance between two electrodes or two conductors VDC=constant fixed voltage.

Some embodiments of the present disclosure are further related to measurements that are performed in a bipolar manner, that is, by measuring the capacitance between electrodes with current flowing from a first electrode P1 to a second electrode P2 and also with current flowing from second electrode P2 to first electrode P1. Certain embodiments employing bipolar measurements may reduce susceptibility to low frequency noise.

Some embodiments of the present disclosure are further related to measuring the number of voltage transition cycles required to accumulate charge to a level established by a comparator threshold. In accordance with some embodiments of the present invention, the switching and comparator functions can be accomplished using standard parallel input/output logic circuits, and the resistance and charge accumulation functions can be accomplished using low cost, readily obtained components.

In certain embodiments, the present disclosure also provides capacitance measuring circuits and methods that may apply voltages to switching elements that time-average to zero over an extended time, which can improve linearity of measurements and reduce sensitivity of measurements to parasitic capacitance.

In certain embodiments, the present disclosure also provides capacitance measuring circuits and methods that may apply voltages to electrodes that time-average to zero over an extended time.

In certain embodiments, the present disclosure also provides capacitance measuring circuits and methods that may apply simultaneous voltages of different phase to multiple driven electrodes, and measure differences in capacitance between two or more driven electrodes and one or more receiver electrodes.

In certain embodiments, the present disclosure also provides capacitance measuring circuits and methods that may apply voltage to two or more electrodes of a first array and measure changes in capacitance among two or more electrodes of a second array, then resolve touched electrodes of the second array, then apply voltage sequentially to touched electrodes of the second array and measure differences in capacitance among two or more electrodes of a first array, thereby resolving touch locations at all intersections of the first array and the second array in a minimum number of measurements.

As such, the present disclosure can provide enhanced capacitance measuring circuits at a low cost and that are easily integrated into standard logic circuits, microprocessors, gate arrays, or application specific integrated controllers (ASICs).

FIG. 1 shows a simplified schematic of a device 10 for measuring mutual capacitance Cm between two electrodes 12 and 13. Measurement circuitry 18 and drive circuitry 19 are connected to receiver electrode 12 and driven electrode 13 and are used to measure Cm. Devices for measuring capacitance can take the form of capacitive input (for example, touch) devices such as buttons and switches, linear sliders, and matrix touch panels, as well as sensors for detecting the presence or amount of a substance positioned proximate the electrode, or a digitizer for capacitive detection of a stylus. In each of these situations, at least one unknown mutual capacitance (denoted Cm herein) results from coupling between electrodes, and second and third unknown capacitances (denoted Cd and Cr herein) results from coupling between driven electrode Cr and ground, and receive electrode Cr and ground. Cm, Cd and Cr change when an object or substance comes into proximity with the electric field generated when AC voltages are applied to at least one of the electrodes. This change may be used as a basis for identifying a touch or the presence of an object.

The present disclosure provides circuitry and methods for measuring parameters of these capacitances including a ratio of Cm and Cr, and the value of Cm and Cr. Methods disclosed in, for example, US Patent Application Publication No. 2008/0142281 may be used to measure capacitance-to-ground Cd, the contents of which is hereby incorporated by reference.

Figure 2:
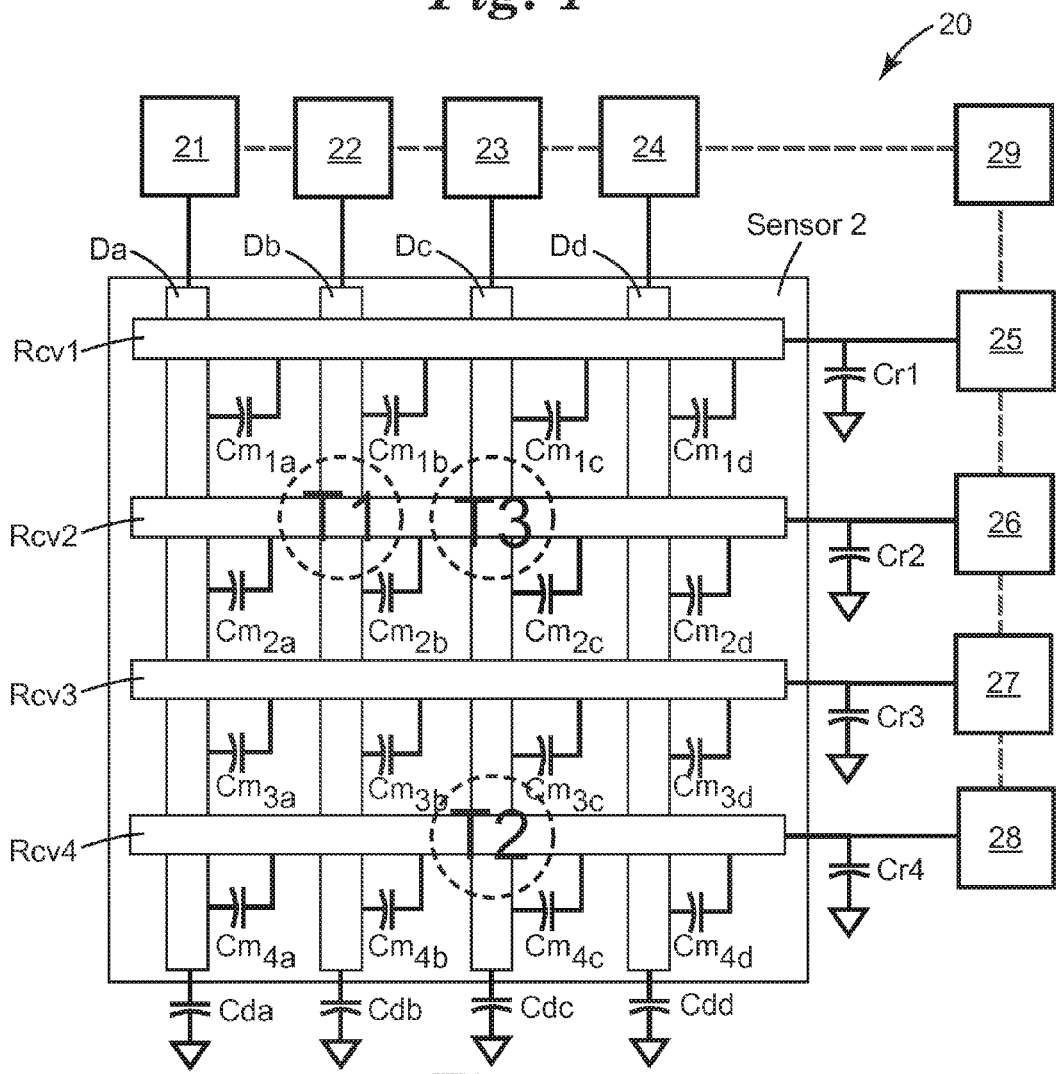
FIG. 2 is a circuit for measuring mutual capacitance between four driven electrodes and four receiver electrodes in proximity.

FIG. 2 shows a simplified schematic of a device 20 for measuring locations of a touching object (for example, touches to points T1, T2, and T3). Driven electrodes Da-Dd have capacitances to ground Cda-Cdd respectively and receive electrodes Rcv1-Rcv4 have capacitances to ground Cr1-Cr4 respectively. Capacitances Cda-Cdd and Cr1-Cr4 change when a touching object is in proximity. Capacitances to ground of measured electrodes can be measured by the methods disclosed herein. Inter-electrode (mutual) capacitances Cm1a-Cm4d can be measured by the methods disclosed herein. Touch locations are resolved (located) by measuring changes in capacitances Cm, and in some embodiments, changes in capacitance to ground are also used to resolve touch location.

Receive circuits 25, 26, 27, and 28 accumulate and measure signals on receiver electrodes Rev1-Rev4 respectively, under the control of controller 29. Circuits 35, 105, and 95 in FIG. 3b, FIG. 10b and FIG. 10a respectively show more detail of receive circuit embodiments. Drive circuits 21, 22, 23, and 24 apply signals to electrodes Da, Db, Dc, and Dd respectively under the control of controller 29. In some embodiments, such as circuit 92, FIG. 10a, circuits 21-28 may be switched between drive and receive functions, so in one mode Da-Dd are driven while Rev1-Rev4 receive, then in another mode Rev1-Rev4 are driven while Da-Dd receive signals.

Example touches T1, T2, and T3 are shown as directly on electrode intersections, affecting only one touched electrode. This is for illustration purposes only; with typical matrix touch screens, a single touch will affect capacitance and signals on two or more adjacent electrodes, and interpolation methods are used to resolve touch locations with finer resolution than the spacing of electrodes. Where interpolation is required or deemed beneficial, additional measurements of Cm (for example, steps 3 and 4 of Algorithm 3, discussed below) may be performed on electrodes adjacent to touched electrodes that were detected in step 1 of the algorithm.

Figure 3A:
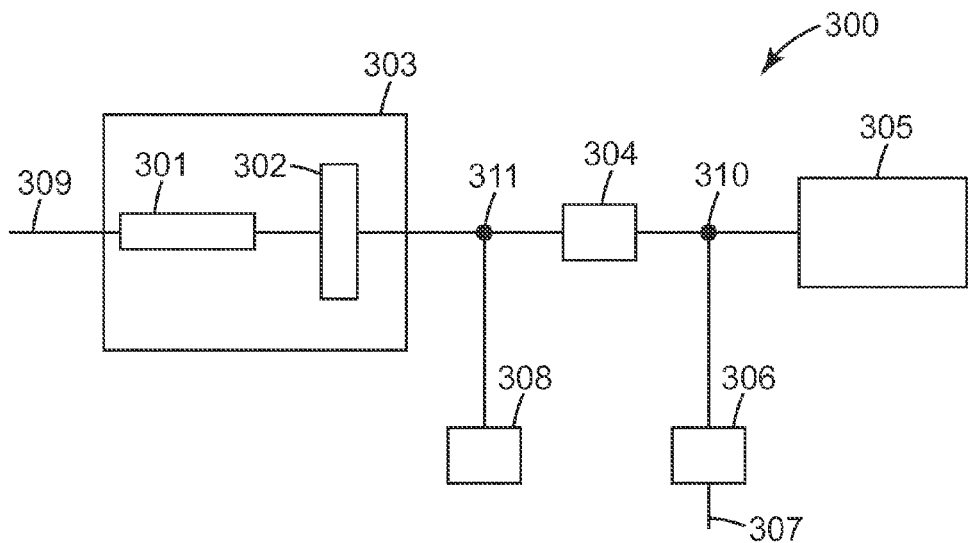
FIG. 3a is block diagram of an apparatus for measuring mutual capacitance.

FIG. 3a is block diagram of an apparatus 300 for measuring mutual capacitance according to an example embodiment of the present invention. The apparatus measures the capacitance between a drive electrode 301 and a receive electrode 302 of a touch sensitive device 303. The apparatus includes a capacitor-based circuit 304 coupled at one end to a voltage measurement circuit 305 and at the other end to the receive electrode 302. The apparatus also includes control circuitry 306 configured and arranged, at the beginning of each cycle of a measurement sequence, to connect a reference voltage 307 to a first node 310 that electrically connects the accumulator capacitor 304 to the voltage measurement circuit 305. The measurement sequence is used to discern and/or resolve apparent touches on the touch sensitive device 303. To this end, the drive electrode 301 is driven with a pulse voltage 309 that has cycles corresponding to the cycles of the measurement sequence. The capacitor-based circuit 304 accumulates an increasing amount of charge during each of the cycles of the measurement sequence. In one implementation, the control circuitry 306 is configured to count the number of cycles that it takes for the voltage at the first node 310 to exceed the threshold voltage of the voltage measurement circuit 305. The apparatus further includes a resistive circuit 308 configured and arranged to draw current from a second node 311 electrically connected to the capacitor-based circuit 304 and to the receive electrode 302 during the measurement sequence.

Figure 3B:
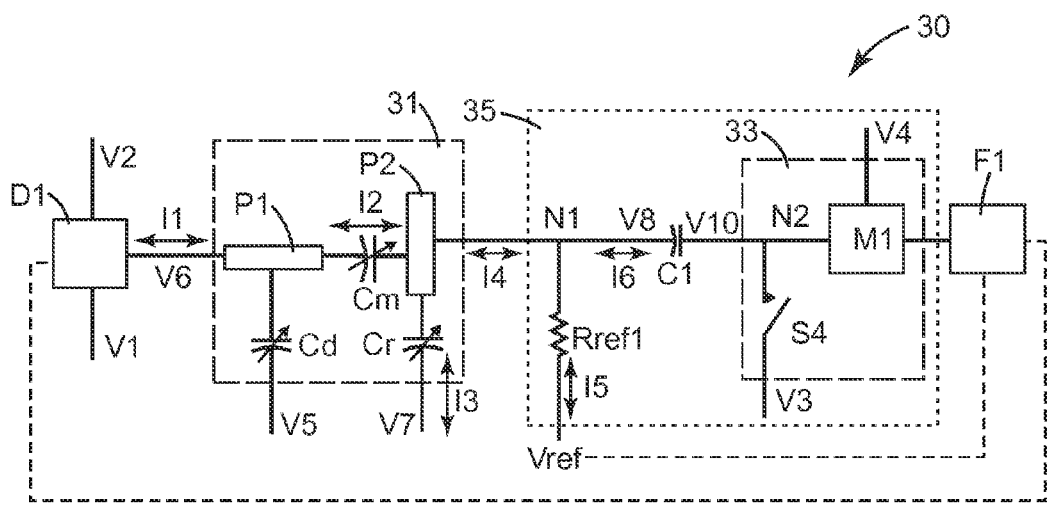
FIG. 3b is a circuit for measuring mutual capacitance between electrodes.

An example embodiment of a general mutual capacitance sensing circuit is illustrated in FIG. 3b which shows a simplified schematic of touch system 30 that measures mutual capacitance Cm between driven electrode P1 and receiver electrode P2 of sensor 31, and Cr. P1 and P2 may be components of a transparent matrix touch sensor where P1 is one of many lower electrodes and P2 is one of many upper electrodes. Cm, Cd, and Cr are shown as variable capacitors because their values change when in proximity with a touching object.

Cd and Cr are parasitic capacitances between electrodes P1 and P2 and surrounding conductive objects, which are generally attached to electrical ground, so typically V5=V7=0V unless a driven shield (not shown) is provided in proximity with sensor electrode P1 or electrode P2 or both. V2 is more positive than V1. In one embodiment, V1=V3=Gnd, and V4=Vcc=2.5V to 5 VDC, and V2=Vdd=5V to 20V.

Driver D1 applies voltage V6 to electrode P1. D1 may comprise a pair of switches (as will be discussed later in reference to system 90 of FIG. 10a), alternately connecting electrode P1 to V1, then V2. Reference resistor Rref1 connects electrode P2 to reference Vref, which in some embodiments is ground (0V) and in other embodiments is a variable voltage. The transition of voltage V6 occurs during the time that switch S4 is closed, and it is preferable that the rate of transitions of V6 have a controlled rate. It is generally preferable that signal V6 be large as possible to maximize the signal to noise ratio (S/N) of measurements. For this purpose, V2 may be greater than V4, and/or D1 may incorporate a capacitor charge pump and/or a magnetic fly-back circuit so peak levels and voltage transitions of V6 can be larger than (V2-V1).

Driver D1 may further incorporate circuits to measure current I1 that flows to driven electrode P1. Exemplary methods of measuring I1 include those disclosed in US Patent Application Publication No. 2008/0142281. Current I1 is proportional to the total capacitance between P1 and its environment (Cm and Cd). A touch (not shown) proximate to P1 and P2 will reduce mutual capacitance Cm and it will also increase capacitances-to-Gnd Cd and Cr.

Receive circuit 35 includes accumulator capacitor C1, reference resistor Rref1, demodulator switch S4, and measurement circuit M1. M1 has high input impedance and low input leakage current. In one embodiment M1 is a comparator or logic gate, as shown, for example, in FIG. 5 and FIG. 6. In other embodiments, M1 may be an analog to digital converter (ADC). Controller F1 includes logic used to control the operation of voltage signal driver D1 and switch S4 and measurement circuit M1.

Figure 5:
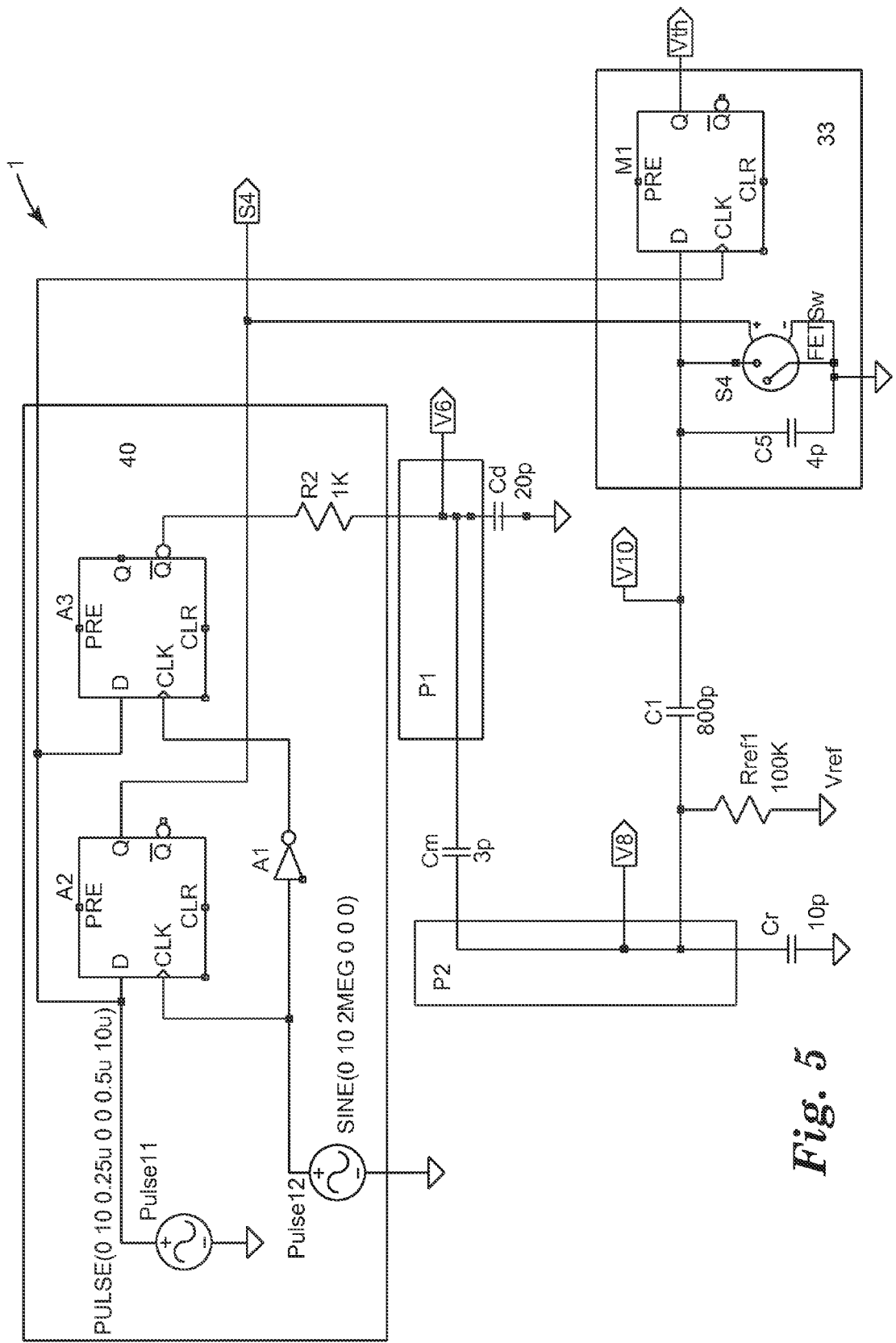
FIG. 5 shows a circuit for measuring mutual capacitance between electrodes.

Another example embodiment of the present invention is shown in FIG. 5. In this example, an illustrated circuit 1 has a fixed reference voltage (Vref) that accumulates charge on capacitor C1 until voltage V10 exceeds the threshold voltage of measurement circuit M1 Exemplary circuit 1 is based on system 30 from FIG. 3b and, therefore, includes component designations that match those of corresponding components in System 30, with the exception of components within perimeter 40, (e.g., A1, A2, A3, Pulse11, Pulse12 and R2) which generate drive pulse V6 and timing pulses for S4 and the clock of measurement circuit (latch) M1. Simulation of this circuit 1, as well as later discussed in connection with circuits 2, 3, and 4 (FIGS. 6, 9, and 11 respectively) can be achieved with a program marketed under the trade name "LTspice IV" available from Linear Technology Corporation of Milpitas, Calif.

Circuit 1 simulates two electrodes (P1, P2) with capacitances to ground Cd and Cr, and mutual capacitance Cm. Reference voltage nodes are labeled. Parameters of Circuit 1 are on the schematic, and as shown below:

Vth=1.5V (switching threshold of M1)
V6=15.0V
S4 resistance=5Ω
S4 input capacitance=C5
Pulse (0 10 0.25u 0 0 0.5u 10u) represents:
Initial V=0
Von:=10
T delay=0.25 uSec
Trise=0
Tfall=0
Ton=0.5 uSec
Tperiod=10.0 uSec
SINE(0 10 2MEG 0 0) represents:
DC offset=0
Amplitude=10.0
Frequency=2.0 Meg
Tdelay=0
Theta (1/S)=0
Phi (deg)=0

System 30 from FIG. 3b, (and also circuit 1 from FIG. 5) may be operated according to Measurement Sequence 1, shown in Table 1. According to Measurement Sequence 1 driver D1 generates an AC wave V6 that drives electrode P1. Transitions in voltage V6 on driven electrode P1 cause electrical charge to flow through mutual capacitance Cm to receiver electrode P2. A (preferably small) portion of charge Q3 flows through parasitic capacitance Cr, and the other portion flows to accumulator capacitor C1. Current into capacitance Cd has negligible effect on measurements.

Charge from either positive (+) or negative (−) transitions of V6 may be measured during a measurement sequence. Measurement Sequence 1 (Table 1) uses (−) transition measurement, as follows:

Before time 0.5 uSec, prior to the first measurement cycle of each measurement sequence, Vref may be set to zero and switch S4 is closed for sufficient time to discharge C1 to zero volts (for example, close S4 until current through Rref1 is near zero).

A measurement cycle begins when switch S4 (signal V(S4)) closes at time=0.4 uSec, just prior to V6 negative transition at t=0.6. During the negative transition (+ to −) of V6, current (electrical charge) from Cm flows through low-impedance C1, and through low-impedance switch and reference voltage V3. Current also flows (undesirably) through parasitic Cr, so the transition rate of V6 is preferably controlled so Cr has higher impedance than the series impedance of C1, S4, and V3.

During the sample time when S4 is closed, C1 discharges with a (relatively long) time constant of approximately τ1=[(Cm+Cr+C1))*Rref1]. This discharge should be minimized.

As soon as possible after the negative transition of V6 has ended, S4 is opened (at t=1).

Minimal current can flow through C1 when S4 is open, (except for leakage and parasitic capacitance of S4 and M1) so C1 holds the charge that flowed from Cm during the negative transition of V6.

Figure 10A:
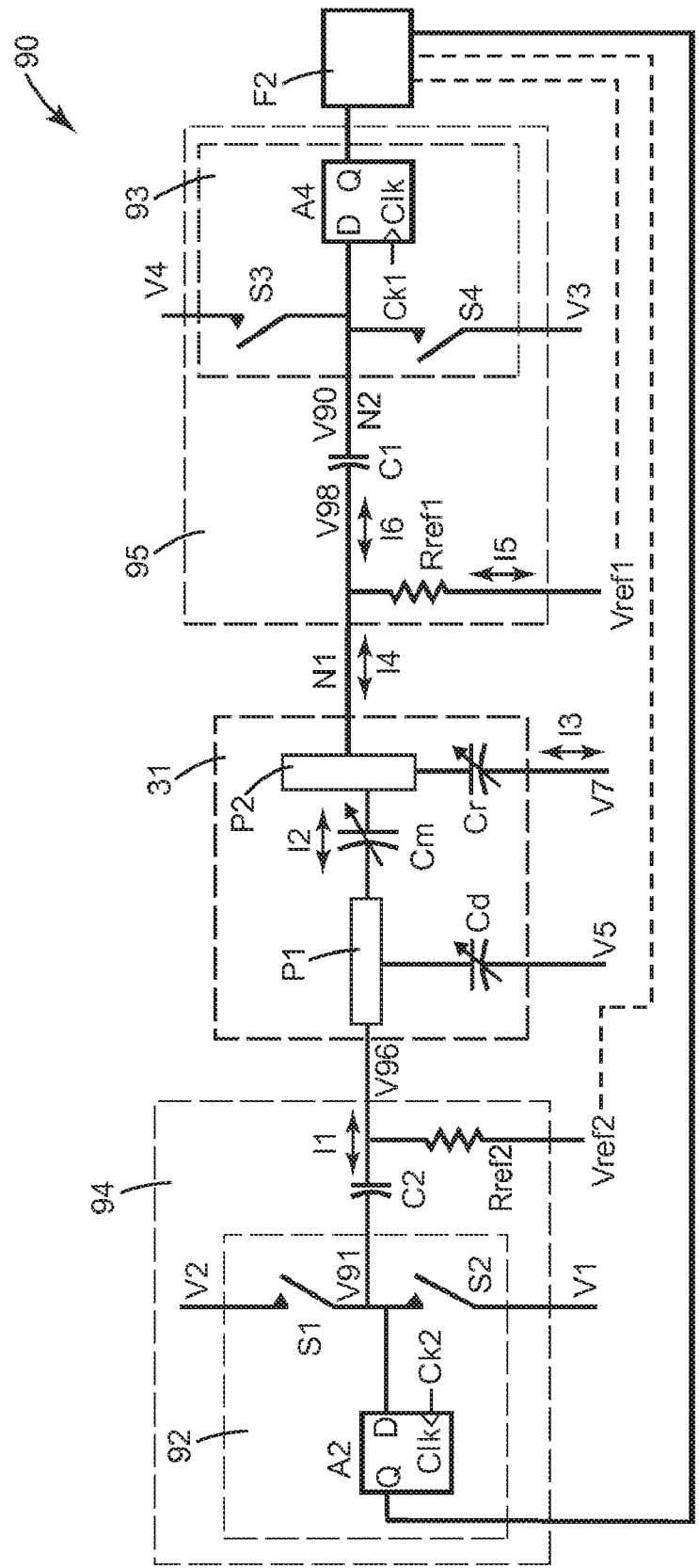
FIG. 10a is a circuit for measuring mutual capacitance between electrodes and for measuring a ratio of mutual capacitance to capacitance-to-ground of electrodes.
Figure 10B:
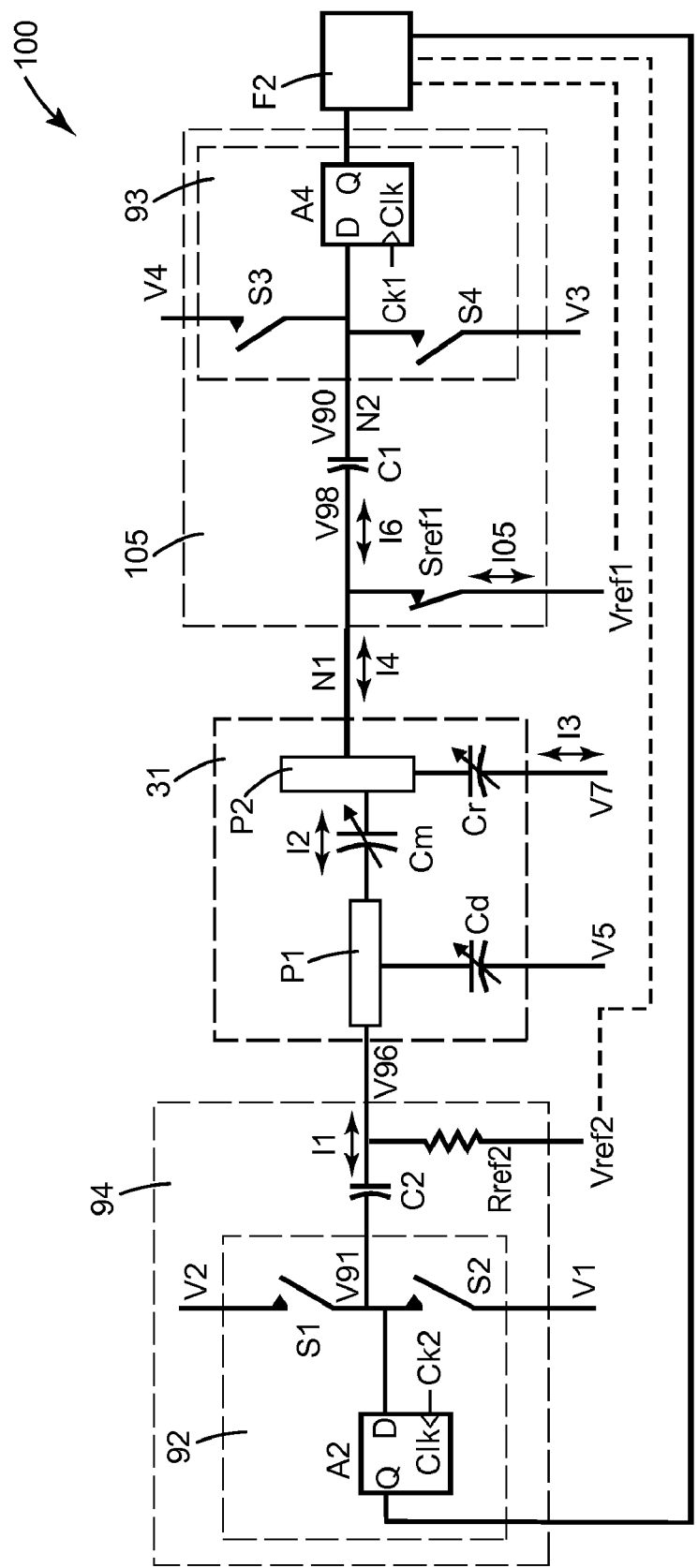
FIG. 10b is a circuit for measuring mutual capacitance between electrodes and for measuring a ratio of mutual capacitance to capacitance-to-ground of electrodes.

After a fast (+) transition starting at t=1.1, voltage V8 discharges with a time constant of approximately τ2= [(Cm+Cr)*Rref1]. from t=1 to t=10.5 uSec. τ2 may be reduced by using a switching element Sref1 between node N1 and Vref, (see FIG. 10b). Closing Sref1 when S4 is open (between times t=1 and t=10 uSec in this example) can reduce τ2 significantly. A transistor in place of Rref can also beneficially increase time constant τ1.

Measurement of voltage V10 may be made by measurement circuit M1 just before S4 re-closes at t=10.5, ending the first measurement cycle. In certain embodiments the voltage across Rref1, (V8-Vref) discharges to near Vref before V10 is measured. In other embodiments, an ADC measurement is made after a specific number of measurement cycles are executed.

V6 remains positive for about 9 uSec in this example. This settling time may vary widely depending on capacitance magnitudes, accuracy requirements, noise, and measurement time constraints, but preferably longer than several τ2 to allow voltages V8 and V10 to settle to a stable value.

Figure 4A:
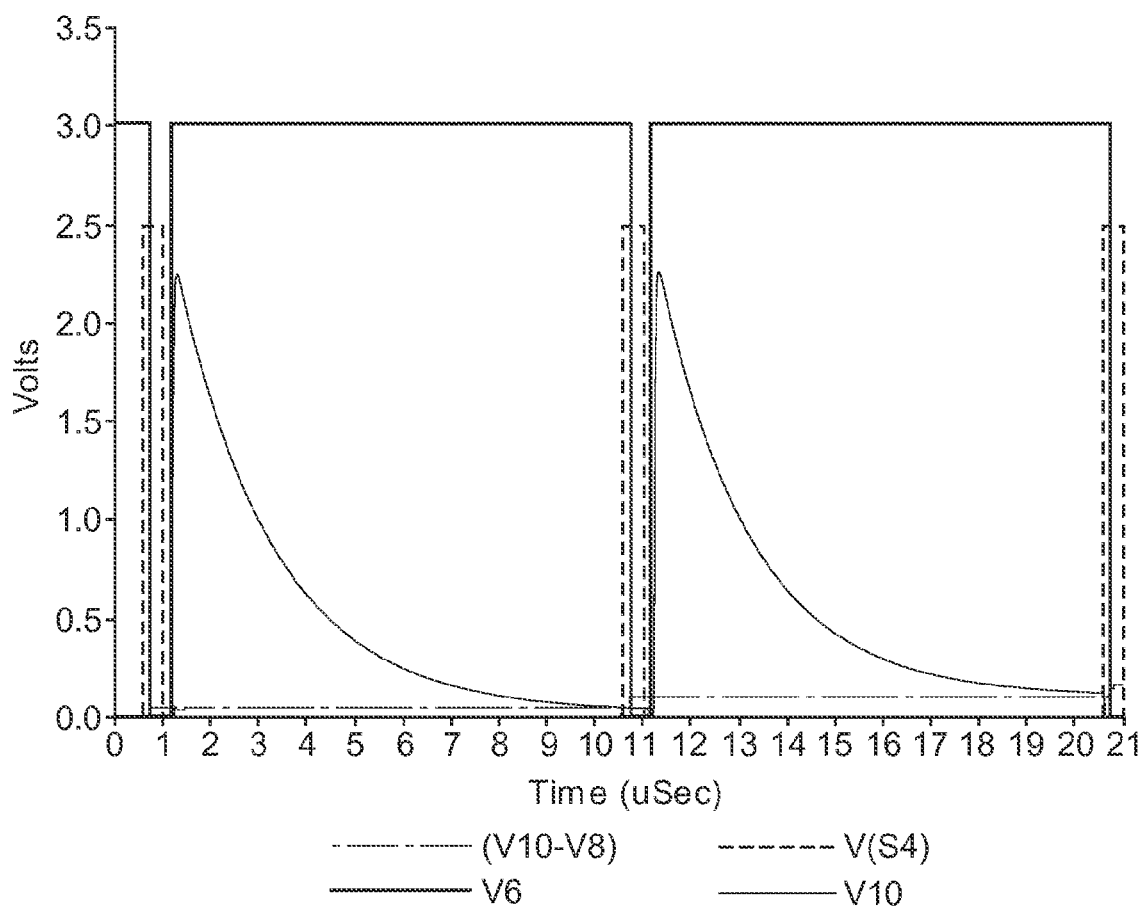
FIG. 4a is a graph showing simulated waveforms of an embodiment of the invention.
Figure 4B:
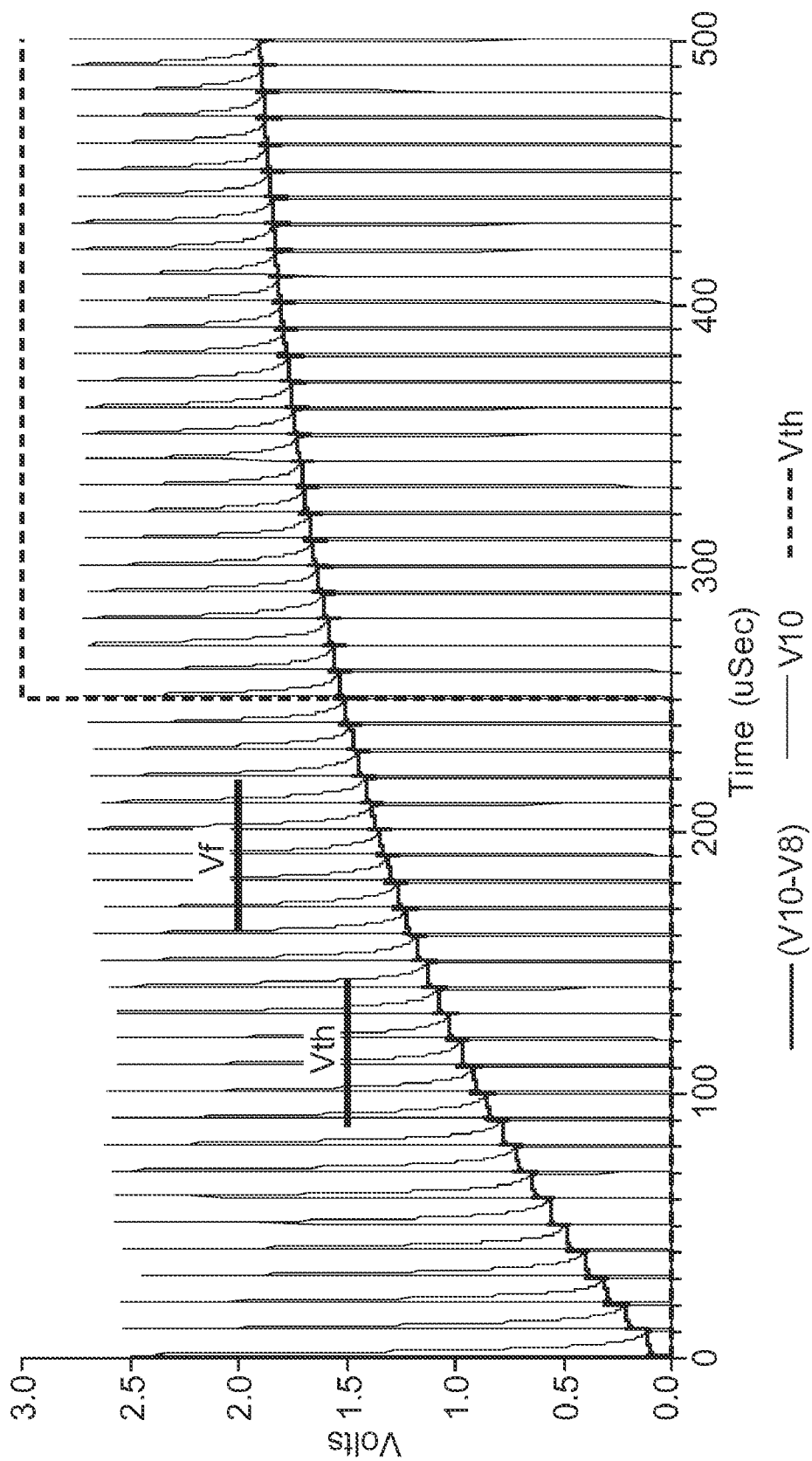
FIG. 4b is a graph showing simulated waveforms of an embodiment of the invention.

During each subsequent negative transition of V6, S4 is closed and incremental charge flows through Cm, into C1, and C1 accumulates an increasing amount of charge (and voltage) during each cycle, as indicated by (V10-V8) in FIG. 4a and FIG. 4b. FIG. 4b shows the waveforms of a complete Measurement Sequence resulting from the simulation of Circuit 1. FIG. 4a shows more detailed waveforms of several Measurement Cycles of Circuit 1. Magnitudes of waveforms in FIG. 4a are not to scale. V(S4) and V6 are reduced in magnitude from 10V and 15V respectively for illustration purposes.

After a number of cycles, voltage V10 exceeds the M1 threshold voltage. FIG. 4b shows an embodiment where V10 (denoted Vth in FIG. 4b) exceeds the M1 threshold voltage (1.5V) at about t=250 uSec, after 25 measurement cycles. A larger accumulator cap C1 would have ramped more slowly, so more measurement cycles would have been required.

TABLE 1

Measurement Sequence 1; Negative Pulse Transitions

| Step | Time (uS)** | V6 | Vref | S4 | Actions |
|---|---|---|---|---|---|
| N0 | 0.0 | High | 0 V* | Closed | Reset C1 to 0 Volts |
| N1 | 0.3 | High | 0 V* | Closed | Test A2*** |
| N2 | 0.7 | ↓ | 0 V* | Closed | Count + 1 |
| N3 | 1.0 | Low | 0 V* | Opens | S4 opens |
| N4 | 1.1 | ↑ | 0 V* | Open | |
| N5 | 10.5 | High | 0 V* | Closes | Test A2***, then close S4 |
| N6 | 10.7 | ↓ | 0 V* | Closed | Count + 1 |
| N7 | 11.0 | Low | 0 V* | Opens | S4 opens |
| N8 | 11.1 | ↑ | 0 V* | Open | |
| N9 | 20.5 | High | 0 V* | Closes | Test A2***, then close S4 |
| N10 | 20.7 | ↓ | 0 V* | Closed | Count + 1 |

In one embodiment: Repeat Steps N7-N10 until V10 crosses a threshold.
In another embodiment: Continue for X counts, then measure V10 with an ADC method, e.g. Vref ramps at a reference rate until V10> threshold voltage.
In a further embodiment: (−) ramp Vref1 starting at t = 0.
In yet another embodiment: a second electrode is driven with V7, having opposite phase to V6.
*Vref = 0 or as described in separate Embodiments.
**Times refer to the example waveforms in FIG. 4a.
***A2 is tested at the end of each measurement cycle and count is incremented only if the threshold-crossing method is used.

Switch S4 is closed during a sample time (for example, t=10.5 to t=11) during which charge flows through C1. The sample time is preferably minimized to include the duration of negative transitions of V6 only. The preference for short Sample times and relatively long τ2 settling times leads to a preferred V6 waveform with short-duration negative pulses and longer duration positive pulses as shown in FIGS. 4a and 4b.

In an exemplary embodiment, electrodes P1 and P2 can be maintained at an average of 0 volts DC. Vref=0 holds P2 at an average of 0 volts. AC pulses from driver D1 can be capacitively coupled so V6 can be referenced to ground also, as is the case in drive circuit 94 (FIG. 10a) where P1 is at V96=0V if Vref2=0. This may help avoid problems such as electrolysis and silver migration on sensor electrodes and interconnects.

Yet another example embodiment includes repeated charging cycles that cause the voltage on C1=(V10-V8) to increase exponentially toward a value Vf, which is proportional to the ratio of Cm and Cr, according to the equation (Equation 1):

$$Vf \approx K \cdot V6 \cdot Cm/(Cm+Cr)$$

Where K<1 varies depending on Rref1*C1 and other time constants, but is relatively constant for a given circuit configuration. V6 is the peak-to-peak magnitude of the drive pulse V6 (FIG. 3b) (or V96, which will be discussed in reference to FIG. 10, below).

The measurement can be sensitive to touch because a touch to P1 and P2 reduces Cm and also increases Cr, meaning, in the presence of a touch, a higher number of cycles are needed to raise C1 to the threshold voltage (as compared with the number of cycles needed to raise C1 to the threshold voltage in the absence of a touch). The ratio in Equation 1 combines both changes for maximum effect. Changes in Cr only can also be measured, so the ratio can also be effective in resolving multiple touches to a matrix touch sensor with multiple X and Y electrodes. Also, where a single driven electrode is being used with one or more receive electrodes, the ratio measurement may be sufficient to measure and discriminate one or more touch locations.

According to another example embodiment, using a measurement sensor with multiple driven electrodes can be implemented as shown in FIG. 2. This example embodiment uses an algorithm to resolve multiple touches. The algorithm can assume, for example, that driven electrodes Da-Dd are driven sequentially. A touch to point T1 will reduce the measured level of measurement circuit 26 for each electrode that is driven, due to the increase in capacitance to ground (Cr2) of touched electrode Rcv2. The measured level at 26 will be reduced by a larger amount when electrode Db is being driven, because $Cm_{2b}$ is reduced in addition to Cr2 being increased for this specific measurement. A second touch T2 results in reduced measured signals on electrodes Rcv2 and Rcv4, for every driven electrode. But the received signal on electrode Rcv2 is reduced by a greater amount when electrode Db is driven, and the signal on electrode Rcv4 is reduced more when electrode Dc is driven. A third touch at T3 results in signal reductions described previously for T1 and T2, plus the signal on Rcv2 has greater reduction when both Db and Dc are driven (as compared to when Da and Dd are driven).

Thus the ratio measurement of Equation 1 and a simple algorithm based on relative magnitudes of signal changes can be used to uniquely resolve a touch location or multiple touch locations on a sensor with intersecting electrodes.

Example touches T1, T2, and T3 are shown as directly on electrode intersections, affecting only one touched electrode. This is for illustration purposes only; with typical matrix touch screens, a single touch will affect capacitance and signals on two or more adjacent electrodes, and interpolation methods are used to resolve touch locations with finer resolution than the spacing of electrodes. Interpolation methods known in the art may be applied to measured signals described with respect to all embodiments herein to achieve high touch resolution.

Figure 6:
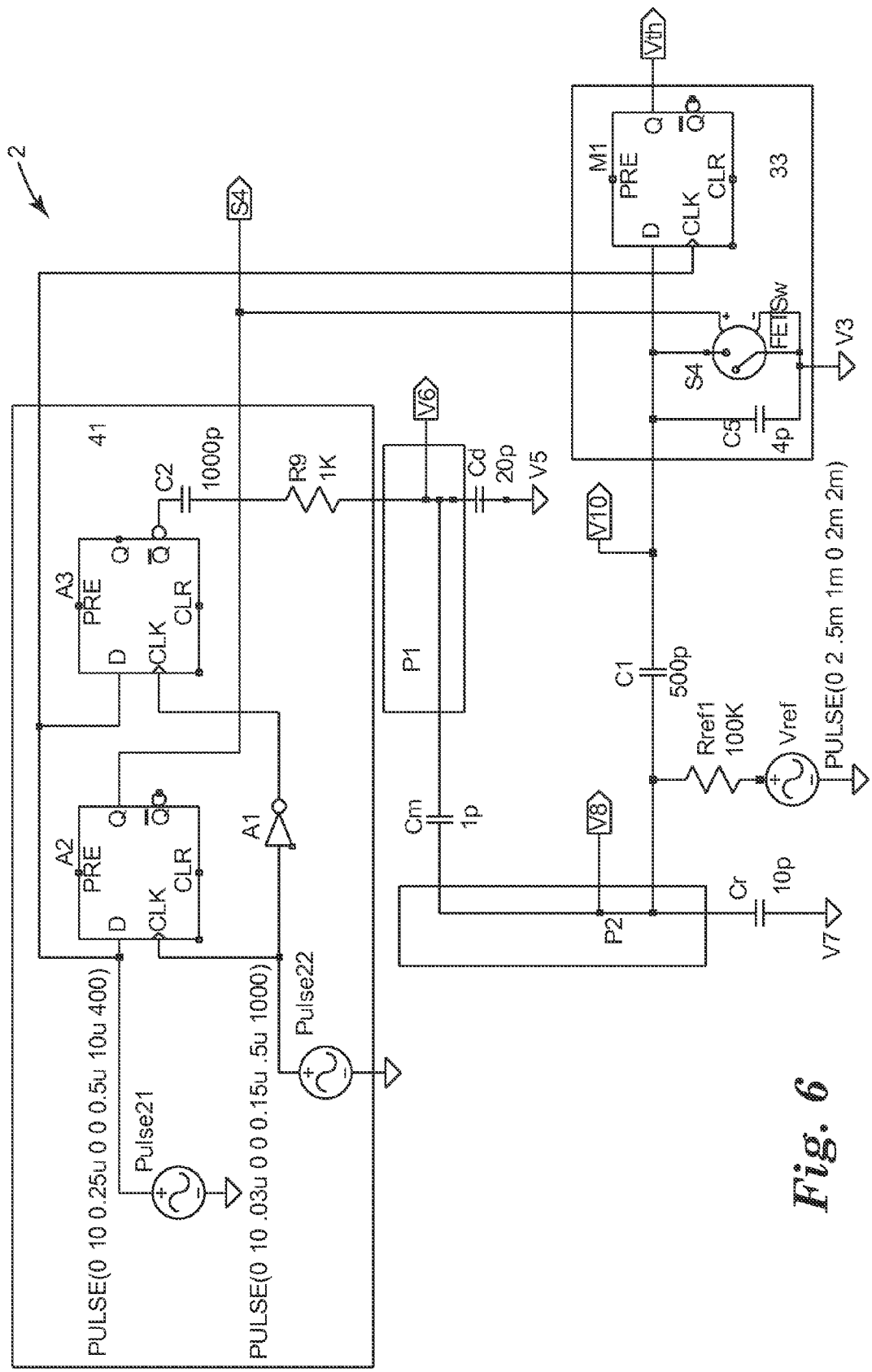
FIG. 6 shows a circuit for measuring mutual capacitance between electrodes.

According to another embodiment, mutual capacitance is measured using a fixed reference voltage Vref for a fixed number of samples and then ramping the threshold voltage. The threshold voltage can be ramped as illustrated in FIG. 6 via circuit 2, as another simulation circuit based on system 30 of FIG. 3b (also using similar component designations in circuit 1, with the exception of components within perimeter 41, (A1, A2, A3, Pulse21, Pulse22, R9) which generate drive pulse V6 and timing pulses). Circuit 2 is similar to circuit 1, while mutual capacitance Cm is 1 pf rather than 3 pf and Vref is a variable voltage rather than Gnd. The ratio of Cm to (Cr+C5) is so small that even with V6=15V pulses, voltage on sample cap C3 ramps to a final value of about 0.7V which is insufficient to reach the threshold of logic input A4.

Figure 7:
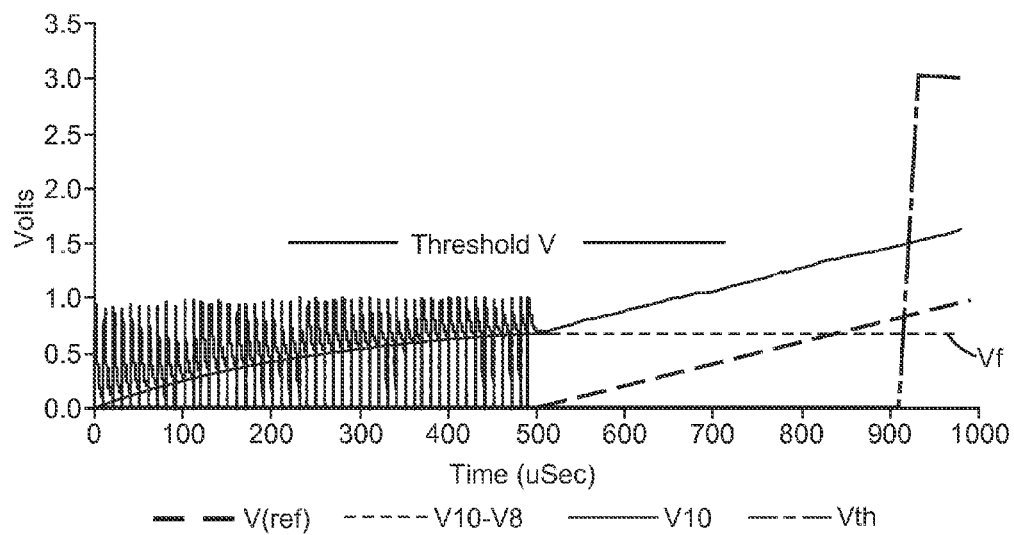
FIG. 7 is a graph showing simulated waveforms of an embodiment of the invention.

FIG. 7 shows exemplary waveforms as circuit 2 (FIG. 6) performs a fixed number (50) of V6 pulses to charge accumulator cap C1 to a voltage Vf, which is near its maximum voltage level. During this charging of C1, Vref is constant 0.0V. After 50 pulses V6 stops pulsing, S4 is open, a counter is clocked at a fixed rate, and Vref1 ramps positive at a known reference rate until V10 crosses the input threshold of A4 and Vth changes state. When Vth changes, the counter state is stored.

The voltage on accumulator cap C1 is related to the stored count which is proportional to (Vth-Vf). The counts required to reach Vth from 0V is known because it can be determined during initial start-up and subsequently when no touches are present. Thus, Vf is calculated as (Equation 2):

$$Vf = Vth - (Vth - Vf).$$

Figure 8:
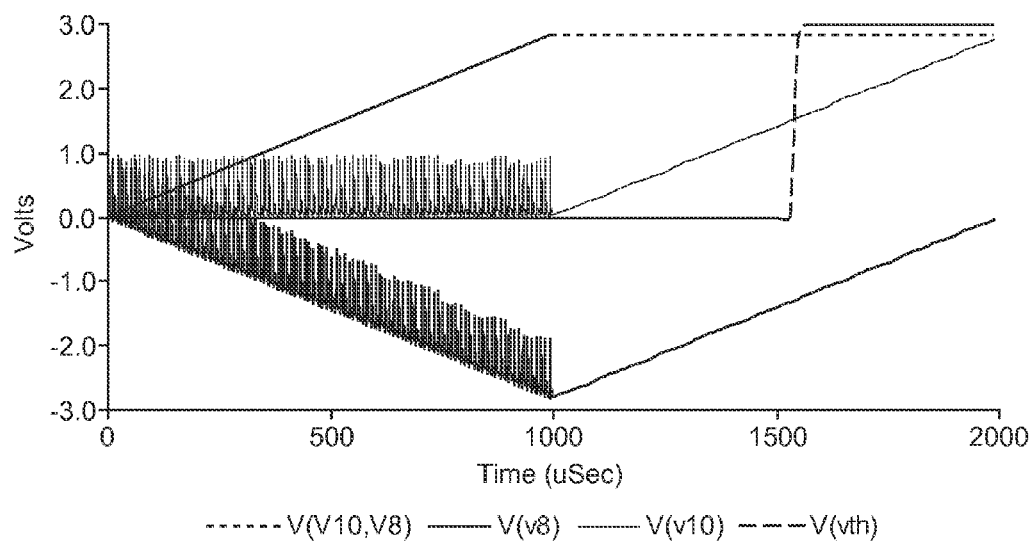
FIG. 8 is a graph showing simulated waveforms of an embodiment of the invention.

Many methods could be devised to either change the voltage threshold of the measurement circuit or to add voltage to V10. Varying Vref, however, allows standard logic circuits to be used for measurement. In some embodiments, this could be beneficial because it helps keep circuit costs low. In some embodiments including matrix touch screens, a single reference voltage can be used with (single or) multiple measurement circuits to perform multiple simultaneous measurements. FIGS. 7 and 8 show signal ramps during ADC cycles. These ramps may be continuous slopes or incremental discrete steps generated by, for example, a pulse generator or a DAC.

FIG. 7 shows a simple ADC ramp starting at 500 uSec, and ramping at a fixed rate until Vth is reached. An alternative ADC waveform may be used to reduce the ramp time during ADC measurements by stepping Vref by a large increment at the beginning of an ADC cycle, (but not enough for any channels to reach Vth). Then Vref is ramped at a fixed rate for the remaining distance until all channels have crossed Vth. For example with respect to FIG. 7, the ADC cycle could be started by stepping Vref+0.5 volts at 500 uSec, then ramping at the rate shown in FIG. 7. This step-and-ramp ADC method can be used with various embodiments disclosed herein).

In a further example embodiment, the circuit 2 of FIG. 6 (and system 30 from FIG. 3) may be operated in another mode, as shown in FIG. 8, which shows exemplary waveforms as circuit 2 performs a fixed number N of V6 pulses to charge accumulator cap C1 to a voltage Vf3, while simultaneously ramping Vref negative at a constant rate Ra1 that maintains V10 near 0.0V. After N pulses, V6 stops pulsing, S4 is open, a counter is clocked at a fixed rate, and Vref ramps positive at a known reference rate Ra2 until V10 crosses the input threshold of A4 and Vth changes state. When Vth changes, the counter is stopped. The count is related to the voltage on accumulator cap C1 which is proportional to (Vth-Vf3). Thus, Vf3 may be calculated from the stored count, using Equation 2.

Charge accumulates on C1 from three sources of current, largely when S4 is closed. I2 current (FIG. 3b) pulses through Cm at relatively high frequency. I3 flows through Cr at relatively high frequency due to changes in V8, largely from pulses of V10 caused by S4 opening transitions. I5 flows through Rref1 from Vref. In certain example embodiments, Vref is fixed during sampling time, V8 averages 0.0V, and V10 ramps exponentially to a limit related to the ratio of Cm and Cr, as discussed with respect to Equation 1. As V10 increases, an increasing portion of the charge on C1 is returned to Cr and Cm each time S4 closes, causing V8 to pulse negative.

Vref changes at a constant rate that keeps V10 near 0.0V even when S4 is open. In this case, over a period of multiple measurement cycles, node N2 becomes a summing junction under the control of F1. Negative transitions of V8 during S4 closure are reduced to near zero so negligible net current flows through Cr. V10 is minimally affected by changes in Cr due to a touch, so V10 is substantially proportional to mutual capacitance Cm, independent of Cr or Cd (as demonstrated in Table 3). FIG. 8 shows V10 is also more linear than V10 shown in FIG. 4b, and resolution of measurements can be increased by sampling for a longer period of time, limited only by the voltage range of Vref. The sampling ramp rate of Vref can be adjusted such that V10 settles to near zero at the end of each measurement cycle (as shown in FIG. 8) during the period from 0 mSec to 1 mSec. Vref ramp rate is under the control of controller F1. During non-touched times, controller F1 may measure V10 and adjust Vref sampling ramp rate such that V10 is near 0.0V. If many receive circuits are connected to a single Vref, all are tested and Vref is adjusted so the average voltage is zero. Subsequently when a touch occurs, capacitances Cm and Cr change by relatively small amounts in the range of 5% to 20%. This change is small enough that linearity remains good, and sensitivity to changes in Cr remains low.

Inter-electrode mutual capacitances in a given sensor are generally near-equal in magnitude. Capacitances to ground of the receive electrodes (or driven electrodes) are also very similar in magnitude. Receive circuits 25-28 (FIG. 2) may be implemented with four of circuits 35 (FIG. 3b). Where a single Vref drives many measurement channels as in FIG. 2, Vref can be adjusted so the average of all V10s is zero. This will generally yield near-zero voltages at the switches of receive circuits 25, 26, 27, and 28 during measurement cycles because Cm's (and Cr's) of a matrix sensor are typically approximately equal. In a typical system of this type, the change to any V10 caused by touching a Cm and/or a Cr is sufficiently small that Vref need not be re-adjusted for each touch.

Figure 9:
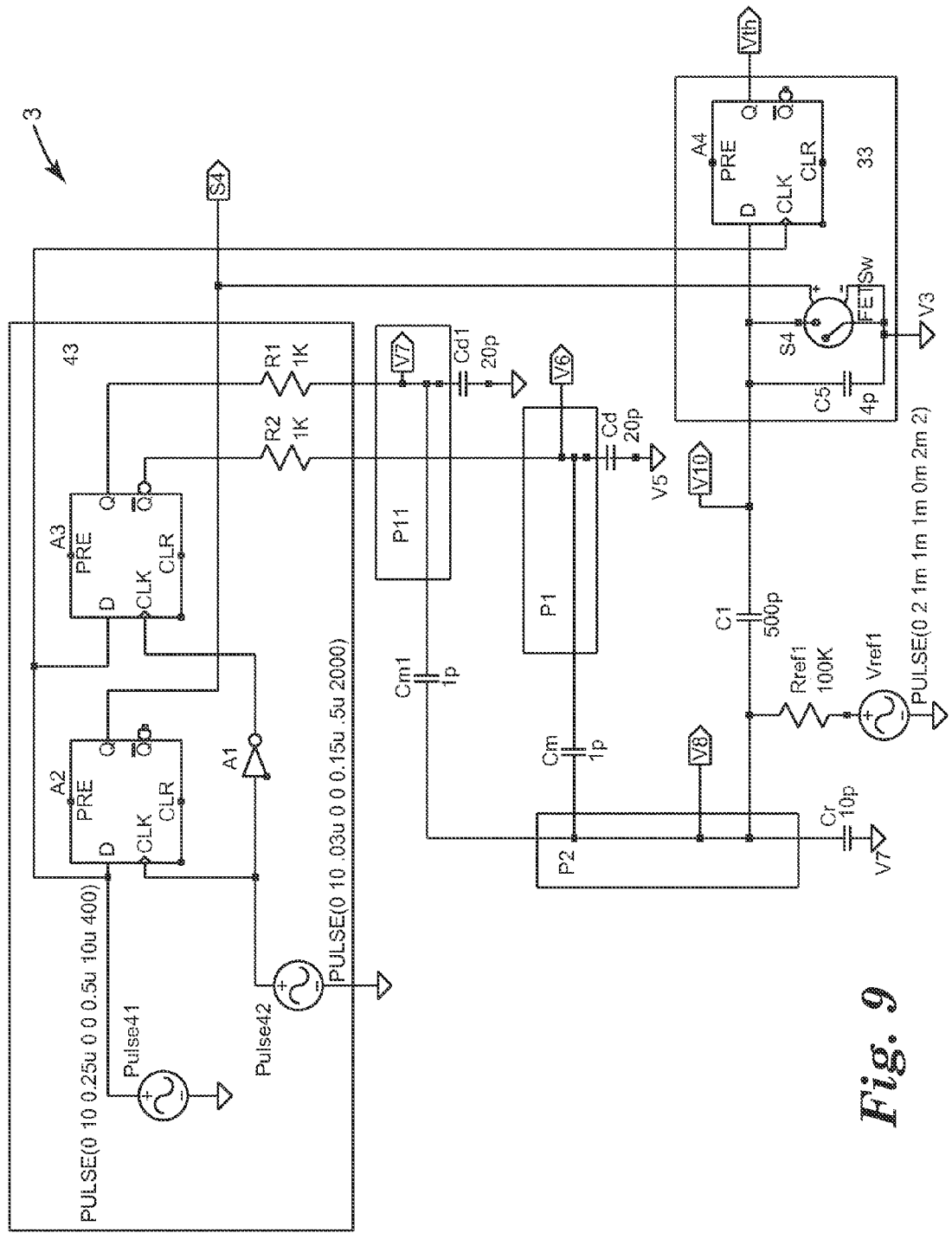
FIG. 9 is a circuit for measuring mutual capacitance among electrodes using multiple driven signals with different phases.

According to another example embodiment, FIG. 9 shows Circuit 3, a variation of Circuit 2 (FIG. 6) simulation whereby two electrodes are driven simultaneously with pulses of opposite phase. Component designations in Circuit 3 match those of corresponding components in system 30 (FIG. 3b), with the exception of components within perimeter 43, (A1, A2, A3, Pulse41, Pulse42, R1, R2) which generate timing pulses, drive pulse V6, and opposite-polarity drive pulse V7 which drives a second driven electrode P11.

Circuit 3 performs a measurement sequence with a fixed number N of simultaneous V6 and V7 pulses for a period, for example, 1 mSec. During (−) transitions of V6 and (+) transitions of V7, S4 is closed. Then S4 is opened and V10 ramps positive at a reference rate and a timer measures the time to cross a threshold voltage, as discussed previously. Alternatively, a measurement sequence may be performed with S4 closed during (+) transitions of V6 and (−) transitions of V7.

If mutual capacitances Cm and Cm1 are equal, drive pulses V6 and V7 will cause equal and opposite currents to flow through Cm and Cm1, so no net charge is accumulated on C1 during measurement cycles. If one of Cm or Cm1 are touched, its value will decrease so currents flowing through Cm and Cm1 will be unequal and a net charge (and voltage) approximately proportional to the difference will accumulate in capacitor C1. For typical values of Cm, minimal voltage accumulates on V10 even during a touch. However, V10 may accumulate positive or negative voltage depending on whether Cm or Cm1 is larger.

If low cost circuits are used, it is generally preferable to maintain 0 or positive voltages at S4 and A4 (typical logic circuits may operate with continuous negative voltages up to 0.2V to 0.3V with minimal effect on measurements). V10 may be controlled within the desired range by several methods:

Vref may be varied during measurement cycles to maintain positive voltage.

Vref may be set to a fixed (preferably small) positive voltage during measurement cycles.

With Vref=0V, S4 may be closed for a period of time before each measurement sequence as described with respect to Step N0 of Measurement Sequence 1.

A measurement sequences may be performed with sampling switch S4 closed during (−) transitions of V6 and (+) transitions of V7, then a second Measurement Sequence may be performed with S4 closed during (+) transitions of V6 and (−) transitions of V7.

Circuit 3 is relatively insensitive to changes in Cr providing minimal voltage accumulates on accumulator capacitors (C1, etc.), so voltages V8 and V10 are near zero.

In another example embodiment, low frequency noise may be reduced by driving pairs of electrodes with opposite-phase signals and alternating between two Measurement Sequences 1 and 2. During Sequence 1, sampling switches (e.g., S4) of measurement circuits are closed during (−) transitions of voltage (e.g., V6) on a first electrode and (+) transitions of voltage (e.g., V7) on a second electrode, then during Measurement Sequence 2 sampling switches (S4) of measurement circuits are closed during (+) transitions of voltage (e.g., V6) on a first electrode and (−) transitions of voltage (e.g., V7) on a second electrode.

The method may include performing the following exemplary algorithm, (described with respect to FIG. 2):

1. Apply signals Va and Vc of equal magnitude and opposite phase to a first driven electrode Da and a second electrode Dc respectively (more than one pair of opposite-phase signals may be applied at one time).
2. Receive channels measure signals on all receive electrodes by performing a first Measurement Sequence wherein negative signal transitions applied to a first electrode and simultaneous positive signal transitions applied to a second electrode are measured during each sample time.
3. Calculate Vf4 for each receive channel using Equation 2, and store a first Vf4 result for each receive channel.
4. Swap the signals such that Va drives second electrode Dc and Vc drives first electrode Da, and apply the signals.
5. Receive channels measure signals on all receive electrodes by performing a second Measurement Sequence wherein positive signal transitions applied to a first electrode and simultaneous negative signal transitions applied to a second electrode are measured during each sample time.
6. Calculate Vf4 for each receive channel using Equation 2, and store a second Vf4 result for each receive channel.
7. For each channel, calculate X=(first Vf4 result−second Vf4 result).
8. A negative value of X (above a noise threshold) indicates a touch to the first driven electrode. A positive value of X indicates a touch to the second driven electrode. The absolute value of X for each receive channel indicates the magnitude of the difference in mutual capacitance between the two driven electrodes and each receive electrode.

Given that all Cm's of Sensor 2 are equal with no touch, the signals sampled by measurement circuits 25-28 will all accumulate to ~0 with no touch applied. When pairs of electrodes are driven simultaneously and at opposite phases, the opposite signals are preferably applied to electrodes that are spaced apart by sufficient distance that a touch to the first electrode will not affect signals on the second electrode.

More than one pair of electrodes may be driven simultaneously and at opposite phases. A first adjacent pair of electrodes may be ramped positive while a second adjacent pair of electrodes (preferably spaced apart from the first pair) are ramped negative. A first non-adjacent pair of electrodes may be ramped positive while a second non-adjacent pair of electrodes are ramped negative, where all four electrodes are spaced apart from one another.

Because signals on accumulator capacitors are proportional to only the differences between electrodes, accumulated signals are smaller than in certain other embodiments. This yields two benefits.

A first benefit is that the settling time of each measurement cycle can be reduced, or resistance increased. The R-C time constant of the reference resistor (Rref) and capacitance of the attached electrode determines settling time of signal during each measurement cycle. Given smaller transitions of the measured signal, less time is required to settle to a stable value before the next cycle. For example in Sequence 1 (Table 1) about 10 uSec (e.g., 4 time) constants are allowed for settling time. A smaller signal could settle to within an acceptable residual value in less time, say for example 3 or even 2 time constants. So, the measurement cycle may be shortened, resulting in faster measurements or the resistance of Rref can be increased, resulting in less attenuation of accumulated voltage during each measurement sequence.

A second benefit is that it may not be necessary to discharge accumulator capacitors after each measurement sequence. Since voltage on each accumulator capacitor is measured and known at the end of each measurement sequence, this residual voltage may be subtracted from the voltage measured during the next measurement sequence and so on, providing that none of the accumulated signals exceeds circuit limits. This is particularly effective where two measurement sequences with opposite-phase signals are applied to each electrode, so a positive Vf from one Sequence will be at least partially reduced by a negative Vf of a subsequent Measurement Sequence. Over a period of time the voltage on accumulator capacitors generally trends toward the average Vref voltage. The period is related to the R-C time constant [Rref*(accumulator capacitor)] and the percentage of time that sampling switches (e.g., S4 in FIG. 3b) are closed.

Turning now to FIG. 10a, system 90 is shown, an embodiment with similar components to system 30 (FIG. 3b), and several additional features. These features may be added individually or in combination. Drive circuit 92 and receive circuit 93 include D flip-flops A2 and A4 which can operate as threshold detectors. A2 is optional, and is only required if circuit 92 is to operate as a receive circuit in addition to driving pulses.

Capacitors C1 and C2 isolate sensor 31 from circuits 92 and 93, so the voltage applied to electrodes P1 and P2 will have average values equal to Vref1 and Vref2. In some embodiments, Vref1 and Vref2 may be held at Gnd potential, so 0.0 volts are applied to sensor 33. This can reduce negative effects of material migration and/or electrolysis that can occur in some systems in the presence of a non-zero time-averaged applied voltage.

System 90 may be used to measure capacitance during either negative-going pulse transitions or positive-going pulse transitions. Preferably, measurements with positive-going transitions and negative-going transitions are alternated to reduce low frequency noise. This may be done in conjunction with any of the embodiments described herein.

Receiver circuit 93 of system 90 has two switches rather than the single switch of circuit 33 in FIG. 3b. Switch S4 connects C1 to V3 which is generally Gnd and S3 connects C1 to V4, which is generally Vcc=3V to 5V. Only one of S3 or S4 operates during a measurement sequence, while the other remains open. S4 is used to measure negative-going pulse transitions as described above. S3 is used to measure positive-going pulse transitions. To accomplish this, C1 is initially charged to (V4) volts, then positive pulses remove charge from C1 successively, decreasing voltage on C1 from V4 to a lower positive value as outlined in Table 2.

TABLE 2

Measurement Sequence 2: Positive Pulse Transitions

| Step | Time (uS)** | V6 | Vref | S3 | Actions |
|---|---|---|---|---|---|
| N0 | 0.0 | High | 0 V | Closed | preset C1 to V4 volts |
| N1 | 0.3 | High | 0 V or ramp | Closed | Test A2* |
| N2 | 0.7 | ↓ | 0 V or ramp | Closed | Count + 1 |
| N3 | 1.0 | Low | 0 V or ramp | Opens | S3 opens |
| N4 | 1.1 | ↑ | 0 V or ramp | Open | |
| N5 | 10.5 | High | 0 V or ramp | Closes | Test A2*, then close S3 |

TABLE 2-continued

Measurement Sequence 2: Positive Pulse Transitions

| Step | Time (uS)** | V6 | Vref | S3 | Actions |
|------|-------------|------|-------------|--------|---------------------------|
| N6 | 10.7 | ↓ | 0 V or ramp | Closed | Count + 1 |
| N7 | 11.0 | Low | 0 V or ramp | Opens | S3 opens |
| N8 | 11.1 | ↑ | 0 V or ramp | Open | |
| N9 | 20.5 | High | 0 V or ramp | Closes | Test A2*, then close S3 |
| N10 | 20.7 | ↓ | 0 V or ramp | Closed | Count + 1 |

In one embodiment: Repeat Steps N7-N10 until V90 crosses a threshold.
In another embodiment: Continue for X counts, then measure V90 with an ADC method, e.g. Vref ramps at a (−) reference rate until V90 < threshold voltage.
In a further embodiment e3: (+) ramp Vref1 starting at t = 0.
In yet another embodiment: vary Vref1 as needed during pulsing to keep V90 positive.
*A2 is tested at the end of each measurement cycle and count is incremented only if the threshold-crossing method is used.
**Times are exemplary, and may vary depending on sensor parameters and circuit components.

In a further example embodiment shown via system 90 of FIG. 10*a*, drive circuits connected to electrode P1 are very similar to the receive circuits connected to P2. In some embodiments, sensor 31 parameters and circuit component values may be selected such that the drive circuit also function as a receive circuit, and the (Vref portion of the) receive circuit can function as a drive circuit.

FIG. 10*b* shows system 100, an embodiment that is essentially identical to system 90, except resistor Rref1 is replaced by switch Sref1. System 100 may be operated as described with respect to Measurement Sequence 1 or Measurement Sequence 2, with the additional provision that Sref1 is closed during the times when switches S4 and S3 are open.

Figure 10C:
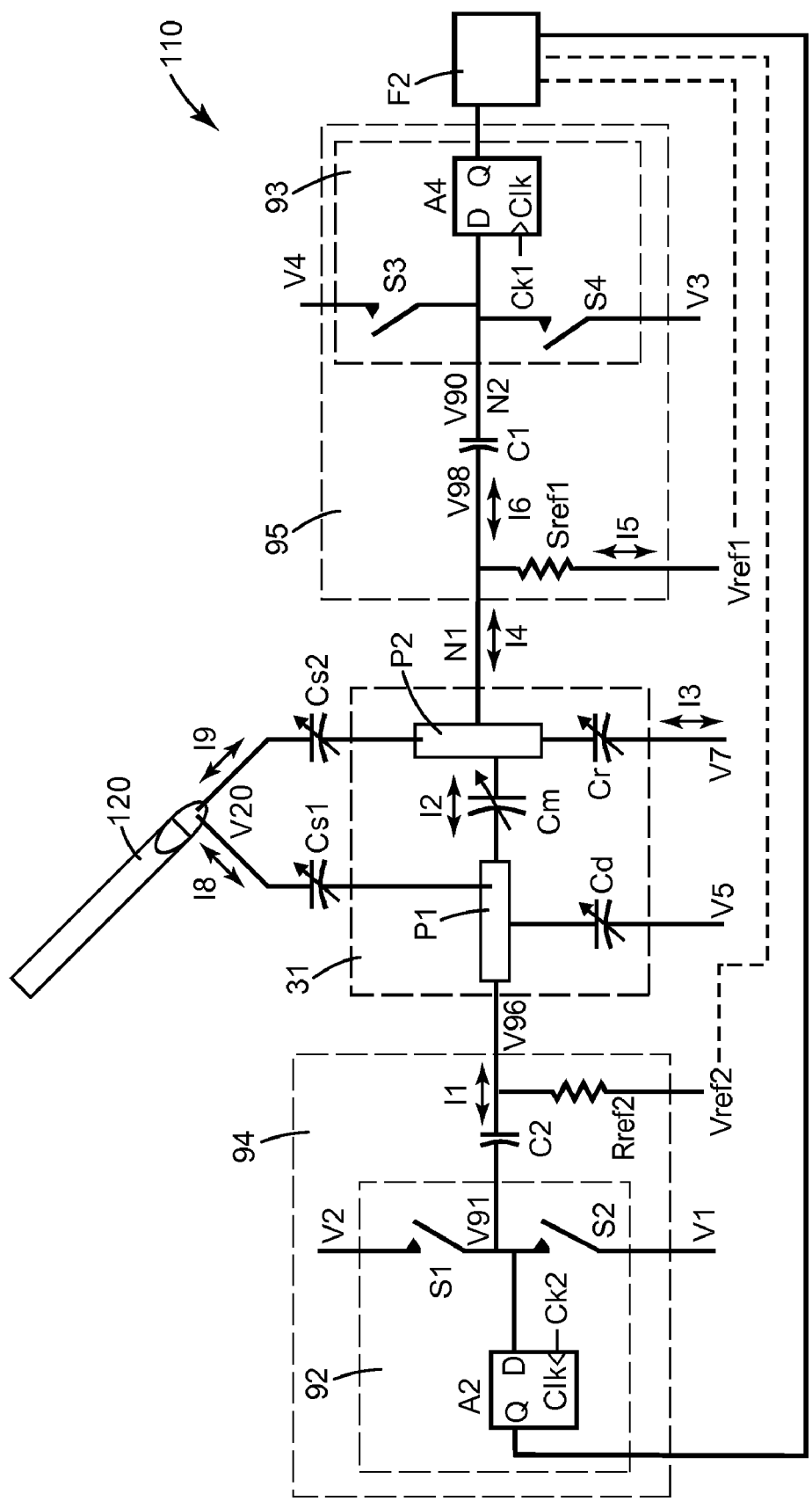
FIG. 10C is a circuit for measuring mutual capacitance between electrodes and for measuring a ratio of mutual capacitance to capacitance-to-ground of electrodes and for measuring mutual capacitance between an array of electrodes and a stylus electrode.

FIG. 10*c* shows a circuit 110 that is similar to circuit 90 (FIG. 10*a*), except a stylus 120 is additionally shown. The tip of stylus 120 can be operated as the drive electrode while all sensor 31 electrodes (P1 and P2) operate as receive electrodes. In stylus detection mode, the objective of circuit 110 is to measure the location of stylus 120 with respect to horizontal electrode(s) P1 and vertical electrode(s) P2. A voltage waveform at the tip of stylus 120 has positive and negative voltage transitions that couple signal currents 18 and 19 to electrodes P1 and P2 through capacitors Cs1 and Cs2 respectively.

Larger stylus currents flowing in an electrode indicate closer proximity of stylus 120, and relative strength of stylus signals on multiple electrodes can be used to locate stylus 120, using methods known in the art, for example as described in U.S. Pat. No. 4,686,332 and in co-pending US Patent Application Publication No. 2008/0106520. The stylus may be any signal-carrying conductive device. It may be a physical pointer device or it may be the finger of a user, provided the finger is activated with a signal that may be coupled to receiver electrodes, for example as described in U.S. Pat. No. 7,453,444.

When operating in stylus detection mode, circuits 94 and 95 are both operated as receive circuits, so S3 and S1 both operate as described in Sequence 3, (or alternatively S4 and S2 can operate if positive stylus voltage transitions are to be measured).

TABLE 3

| Step | V20 | Vref1, Vref2 | S2 & S4 | Actions |
|------|------|------|--------|----------------------|
| N0 | High | 0 V | Closed | Reset C1 & C2 to 0 volts |
| N1 | High | 0 V | Closed | Test A1 & A2 |
| N2 | ↓ | 0 V | Closed | Count + 1 |
| N3 | Low | 0 V | Opens | S2 & S4 open |

TABLE 3-continued

| Step | V20 | Vref1, Vref2 | S2 & S4 | Actions |
|------|------|------|--------|----------------------------------|
| N4 | ↑ | 0 V | Open | |
| N5 | High | 0 V | Closes | Test A1 & A2, then close S2 & S4 |
| N6 | ↓ | 0 V | Closed | Count + 1 |
| N7 | Low | 0 V | Opens | S2 & S4 open |
| N8 | ↑ | 0 V | Open | |
| N9 | High | 0 V | Closes | Test A1 & A2, then close S2 & S4 |
| N10 | ↓ | 0 V | Closed | Count + 1 |

Measurement Sequence 3; Stylus and Negative Pulse Transitions

In stylus-measuring Sequence 3, V90 and V91 are repeatedly connected to reference voltages V1 & V3, which are typically equal, so no significant voltage is applied to sensor 31 by circuit 94 or circuit 95. Currents I2 and I3 are preferably negligible, and the only significant current accumulated on capacitors C1 and C2 are coupled from stylus 120. In one embodiment, I1=I8 and I6=I9 so C1 and C2 accumulate signals proportional to coupled stylus currents I8 and I9. These are proportional to proximity of stylus 120 to electrodes P1 and P2.

One horizontal electrode (P1) and one vertical electrode (P2) are shown in FIG. 10*c* but in practice, multiple horizontal and multiple vertical electrodes are measured simultaneously or near simultaneously. Measurement Sequence 3 is repeated until at least one vertical electrode signal and one horizontal electrode signal accumulate enough voltage on accumulator capacitors to cross their respective thresholds, thus defining a contact point. In one embodiment, stylus signal measurements are sufficiently large on several adjacent horizontal electrodes that interpolation can be used to calculate an accurate stylus position.

Measurement Sequence 3 describes the threshold-crossing method of measurement, but it will be apparent to one skilled in the art that ADC methods other than threshold-crossing could be used to measure voltages V90 and V91, as described with respect to other embodiments. Sequence 3 also describes measurement of negative-going signal transitions of the stylus, and it is also apparent that timing of S1 and S3 could be employed to measure positive going transitions, as described previously.

Figure 11:
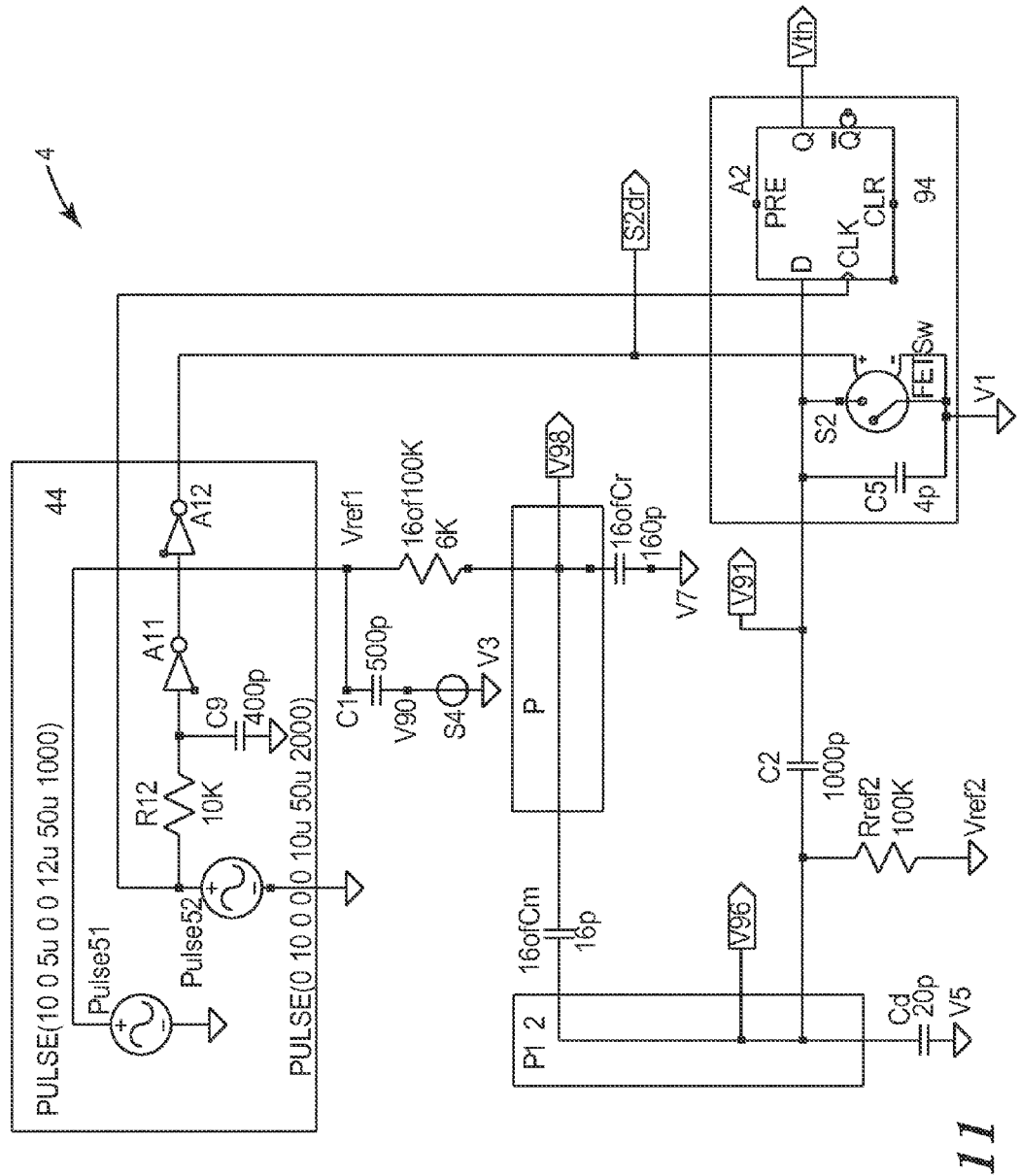
FIG. 11 is a circuit for measuring capacitance-to-ground of electrodes.

FIG. 11 shows a schematic of simulated circuit 4 driving 16 receive electrodes simultaneously via 16 reference resistors. Circuit 4 is one implementation of system 90, and component designations in circuit 4 match those of corresponding components in system 90 (FIG. 10*a*), with the exception of components within perimeter 44, (A11, A12, Pulse51, Pulse52, C9) which generate timing pulses and drive pulse Vref. Most components of circuit 4 are the same as circuit 2; Cm=1 pf, Cd=20 pf, C1=500 pf, and C2=1000 pf. A total of 16 electrodes are driven in parallel, so Cm and Cr are simulated as lumped total capacitors of 16 pf and 160 pf respectively. A single driven electrode and its measurement circuit are shown, though more than one driven electrode is typically present. In fact, a major reason to swap drive and receive functions is to detect which of many driven electrodes are being touched.

In circuit 4, drive pulses are generated by Vref2 (rather than, for example, switches S3 and S4 of FIG. 10*a*). A single Vref2 drives 16 electrodes through 16 Rref's. These couple to (at least) one driven electrode. Switch S2 switches synchronously with (−) transitions of Vref2, so voltage (V91-V96) accumulates on C2 and V91 is measured at A2 using methods outlined in Sequence 1 (Table 1) and/or Sequence 2 (Table 2). The duration (10 uSec) and rate (50 uSec) of drive pulses is slower because capacitance (for example, Cm) levels are higher and settling time of V96 and V91 are longer.

One possible benefit of this embodiment is to detect touch to Driven electrodes by measuring the ratio of mutual capacitance(s) to capacitance-to-ground as described by Equation 1. Exclusive measurement of Cm would not be a goal of such an embodiment. Since all Receive electrodes (that is, 16 of them) are driven simultaneously, a 10% change in any single Cm due to a touch results in <1% change in total Cm's. Thus, this embodiment is relatively insensitive to changes in Cm of any single electrode. But capacitance to ground of each driven electrode (that is, each of 16) is measured separately and simultaneously with sufficient sensitivity to detect a touch to any (or several) driven electrode. Sensitivity measurements from exemplary circuit 4 (FIG. 11) are shown in Table 3 (below).

According to a further embodiment, one method of scanning sensor 2 (FIG. 2) is to drive a signal onto electrode Da from circuit 21, and measure received signals simultaneously on all of electrodes Rcv1-Rcv4 with circuits 25-28. Then circuit 22 drives electrode Db, and Rcv1-Rcv4 are measured again (and so forth) until after four measurement sequences all Cm's are measured.

One possible benefit to switching drive versus receive functions is speed of detecting touches, including multiple touches. The following exemplary sequence is given with reference to FIG. 2:

1. One or more of circuits 25-28 drive pulses simultaneously onto electrodes Rcv1-Rcv4, and circuits 21-24 measure the pulses that are coupled to electrodes Da-Dd. The measurement sequence of various embodiments disclosed herein may be used for these measurements. The number of drive circuits activated for this measurement depends on the relative magnitudes of Cm and Cd. Equation 1 indicates Cm coupled from driven electrodes should be less than Cd, in order to maximize the sensitivity to Cd.
2. Given touches at points T1, T2, and T3, capacitances-to-ground Db and Dc are increased by the touches. Measurements indicate electrodes Cdb and Cdc are touched, but the number of touches is not known and which of electrodes Rcv1-Rcv4 are touched is not yet known. Cm2b, Cm2c, and Cm4c are also reduced, but it is not necessary to resolve which intersection(s) are touched until Step 4.
3. Touched electrode Db is then driven by circuit 22 and signals on Rcv1-Rcv4 are simultaneously measured by circuits 25-28. The touch at point T1 is resolved due to the change in mutual capacitance Cm2b, measured by circuit 26. (Methods relating to various embodiments disclosed herein may be used for this measurement).
4. Touched electrode Dc is then driven by circuit 23 and signals on Rcv1-Rcv4 are simultaneously measured by circuits 25-28. The touch at point T2 is resolved due to the change in capacitance Cm4c and the touch at T3 is resolved due to the change in capacitance Cm2c. (Methods relating to various embodiments disclosed herein may be used for this measurement).

In the simple example of system 20 of FIG. 2 with 4×4 electrodes, these methods result in resolution of three touches after three measurement sequences rather than four. This is a modest gain, but in a system with an array of 16×16 electrodes, these methods still require only 3 measurement sequences to resolve 3 touches, rather than 16 measurements required by prior-art sequential drive methods.

Table 3 shows the sensitivity of five exemplary embodiments. Circuits were simulated as touch sensitive capacitors were changed by 10% as indicated, and the resulting change in voltage across C1 was measured after 40 to 100 measurement cycles. Timing parameters of each test are indicated in schematic drawings of circuits 1, 2, 3, and 4 (FIGS. 5, 6, 9, and 11).

TABLE 3

Simulated Touch Sensitivity

| Method | Circuit capacitances | | | V10 (or V91) change (mV/pf) | | |
|---|---|---|---|---|---|---|
| | C1 (pf) | Cm (pf) | Cr (pf) | Cm − 10% | Cr + 10% | Cd + 10% |
| Embodiment 1 | 800 | 3 | 10 | 510 | 92 | 0 |
| Embodiment 2 | 500 | 1 | 10 | 720 | 35 | 0 |
| Embodiment 3 | 500 | 1 | 10 | 730 | 0 | 0 |
| Embodiment 4 | 500 | 1 | 10 | 710 | 0 | 0 |
| Embodiment 5 | 1000 | 16 | 20 | 56 | 0 | 25 |

Values of components and voltages and timing of waveforms circuits can be selected to match the parameters of touch sensors being measured. In exemplary circuits thus described, C1, C2, Rref, Vref, V6, and others were chosen to operate with capacitances Cm, Cd, and Cr. Where electrodes have a significant resistance, component values and waveform timing may be adjusted to achieve accurate measurements. In many cases, waveform timing can be adjusted and optimized under the control of a program in controller 29 (FIG. 2).

In some embodiments, receiver circuits 33 (FIG. 3b) and 93 (FIG. 10a, 10b, 10c) and driver circuits 94 (FIG. 10a, 10b, 10c) and D1 (FIG. 3b) may be implemented by configuring a programmed input/out (PIO) port of a typical microprocessor as an open collector switch, and using the PIO input gate/latch as a comparator. Other common logic integrated circuits may also be used to implement these circuits. Other arrangements of standard low cost logic circuits will be apparent to those skilled in the art.

Several ADC methods are used in the examples thus described. Additional methods will occur to those skilled in the art. Specifically, certain embodiments use timed ramps to measure the voltage on C1. Alternatively, successive approximation and other faster ADC methods or a combination of ADC methods may be used if measurement time is important.

The circuits and methods described here can be used to implement high speed simultaneous measurements of multiple (receiver) electrodes, using standard circuit components at low cost. Circuits may also be configured from a simple microprocessor driving a few electrodes to a high resolution touch panel with many electrodes. Many of the embodiments described herein can be made from the standard PIO ports of microprocessors or low cost logic circuits, and a few passive external components.

For example, a small mutual capacitance touch system with 8 buttons could be implemented with a simple microprocessor using one PIO port to drive one electrode and one PIO port to measure eight electrodes simultaneously.

Higher resolution touch systems with more electrodes can be configured with higher voltage drive signals, low impedance demodulator switches, and higher ESD tolerance. For this purpose a microprocessor may be augmented with (low cost) circuits like the STP16CPS05 sixteen channel driver available from ST Microelectronics of Geneva, Switzerland, and/or the SN74LVC16646A 16-channel transceiver/register available from Texas Instruments of Dallas, Tex.

In one embodiment, measurement of signal (and noise) is performed only during the sample time when the sampling switch (for example, S4 in system 30 (FIG. 3b)) is closed. The optimal signal measured in C1 is a pulse of current with controlled rate of change and magnitude during the transition of voltage V6. To avoid noise, S3 should be closed for the minimum time required to measure the current pulse that flows during transitions of V6.

Noise harmonics with a period~[sample period], (for example, 0.5 uSec in FIG. 4a) may be reduced by:
1. Varying the sample time in a pseudo-random fashion during each measurement cycle; or,
2. Setting the measurement cycle period to be an odd multiple of the sample time, so an in-phase noise harmonic during one sample time will be out of phase during the next sample time.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention, including that set forth in the following claims.

What is claimed is:

1. An apparatus for measuring a parameter related to capacitance between a drive electrode and a receive electrode of a touch sensitive device, the apparatus comprising:
   an accumulator capacitor coupled at one end to a voltage measurement circuit and at the other end to the receive electrode;
   control circuitry configured and arranged, during each cycle of a measurement sequence, to connect a reference voltage to a first node that electrically connects the accumulator capacitor to the voltage measurement circuit; and
   a discharge circuit configured and arranged to draw current from a second node electrically connected to the accumulator capacitor and to the receive electrode during the measurement sequence, wherein the drive electrode and the receive electrode are co-located under the surface of a touch sensor.

2. The apparatus of claim 1, wherein the discharge circuit comprises a resistor.

3. The apparatus of claim 1, wherein the discharge circuit comprises a transistor.

4. The apparatus of claim 1, wherein the control circuitry is further configured to connect the reference voltage to the first node during one of negative or positive transitions of a voltage that drives the drive electrode, a transition of the voltage that drives the drive electrode occurring when the reference voltage is connected to the first node.

5. The apparatus of claim 1, wherein the control circuitry is further configured to count the number of cycles of the measurement sequence that it takes for the voltage at the first node to cross a threshold voltage of the voltage measurement circuit.

6. The apparatus of claim 1, wherein the accumulator capacitor is configured to accumulate charge during each cycle of the measurement sequence, and the parameter related to capacitance between the drive electrode and the receive electrode is the capacitance between the drive electrode and the receive electrode.

7. The apparatus of claim 6, wherein the control circuitry is further configured to charge the accumulator capacitor for a fixed number of cycles of the measurement sequence and the resistive circuit is further configured to connect the second node to a second reference voltage that is fixed during, the fixed number of cycles, and wherein, at the end of the fixed number of cycles, the control circuitry is further configured to vary the second reference voltage until the voltage at the first node crosses a threshold voltage of the voltage measurement circuit, 8. The apparatus of claim 7, wherein the control circuitry is further configured to count the number of cycles of the measurement sequence after the fixed number of cycles that it takes for the voltage at the first node to cross the threshold voltage of the voltage measurement circuit.

9. The apparatus of claim 1, further comprising drive circuitry configured and arranged to generate an AC wave to drive the drive electrode, and wherein the cycles of the AC wave correspond to the cycles of the measurement sequence and the control circuitry is further configured to connect the reference voltage to the first node during negative or positive transitions of the AC wave.

10. The apparatus of claim 1, wherein the voltage measurement circuit is an analog to digital converter, and the parameter related to capacitance between the drive electrode and the receive electrode is a ratio of capacitances.

11. The apparatus of claim 1 wherein the accumulator capacitor is directly connected to the receiving electrode by means, not comprising an electric switching element, for connecting.

12. The apparatus of claim 1, wherein the drive electrode is located in a stylus and at least one receive electrode, is in the touch sensitive device.

13. Apparatus for measuring a parameter related to the capacitance between a drive electrode and a receive electrode, the apparatus comprising:
   a sample capacitor having two terminals, one of the two terminals directly connected to the receive electrode by means, not comprising an electric switching element, for connecting;
   a voltage measurement circuit directly connected to the other one of the two terminals of the sample capacitor;
   a first reference voltage;
   a second reference voltage,
   a discharge circuit with one terminal connected to the receive electrode, and another terminal connected to a first reference voltage;
   at least one electric switching element having both a single respective closed state in which it connects the other terminal of the sample capacitor to the second reference voltage, the switching element further having a respective open state in which it does not connect the other terminal to the second reference voltage; and
   a switch controller for closing at least one electric switching element during selected times during a measurement sequence.

14. The apparatus of claim 13, wherein the discharge circuit comprises a resistor.

15. The apparatus of claim 13, wherein the discharge circuit comprises a transistor switching element.

16. The apparatus of claim 13, further comprising a voltage-modulation-circuit configured to vary the first reference voltage during the measurement sequence.

17. The apparatus of claim 16, wherein the voltage-modulation-circuit is configured to change the first reference voltage at a constant rate during the measurement sequence.

18. The apparatus of claim 13, further comprising a voltage-modulatton-circuit configured to change the first reference voltage after the measurement sequence.

19. The apparatus of claim 18, wherein the voltage-modulation-circuit is configured to change the first reference voltage at a constant rate after a measurement sequence.

20. A circuit-based method of sensing the presence of a body proximate a coupling capacitor and spaced apart therefrom by a dielectric layer, the coupling capacitor comprising a drive electrode and a receive electrode, the drive electrode electrically connected to a signal generator supplying a plurality of voltage cycles, the receive electrode connected to a first reference voltage through a resistor and to a first terminal of a capacitor whose second terminal is connected to a switch and to a voltage measuring circuit, the method comprising the steps of:
  a. controlling the switch so as to connect the second terminal of the capacitor to a second reference voltage;
  b. controlling the switch during a first predetermined portion of one of the voltage cycles to connect the second terminal of the capacitor to the second reference voltage, thereby transferring electric, charge between the receive electrode and the capacitor;
  c. controlling the switch during a second predetermined portion of the one of the voltage cycles to disconnect the second terminal of the capacitor from the second. reference voltage; and
  d. performing a measurement sequence that includes one of
    i. comparing a voltage on the second terminal of the capacitor to a threshold value, and repeating steps h), c) and d) for additional ones of the voltage cycles until the voltage on the second terminal of the capacitor crosses the threshold, value, or
    ii. repeating steps h) and c) for a predetermined number of the voltage cycles, and then measuring the voltage on the second terminal of the capacitor.

21. The circuit-based method of claim 20, wherein step d) includes the steps of comparing the voltage on the second terminal of the capacitor to a threshold value, and repeating steps 13), c) and d) until the voltage on the second terminal of the capacitor crosses the threshold value.

22. The circuit-based method of claim 20, wherein step d) includes the step of repeating steps h) and c) for as predetermined number of the voltage cycles, and then measuring the voltage on the second terminal of the capacitor.

23. The circuit-based method of claim 20, further comprising varying the first reference voltage during the measurement sequence.

24. The circuit-based method of claim 20, wherein varying the first reference voltage includes changing the first reference voltage at a constant rate during the measurement sequence.

25. The circuit-based method of claim 20, wherein the drive electrode couples to multiple receive electrodes, each of the receive electrodes connected to the first reference voltage through a resistor and to a first terminal of a capacitor whose second terminal is connected to a switch and to a voltage measuring circuit, and wherein steps a), b), c) and d) are performed simultaneously for each of the receive electrodes.

26. Apparatus for measuring a capacitance between a drive electrode and a receive electrode, the apparatus comprising:
  at least three switching elements, each of the at least three switching elements having both a respective open stale and a single respective closed state, and each of the at least three switching elements being electrically connected Lo one of three distinct reference voltages;
  a sample capacitor having two terminals, a proximal one of the two terminals connected to the receive electrode by means, not comprising one of the switching elements, for connecting and the other one of the terminals being distal from the receive electrode;
  a voltage measurement circuit connected to the other one of the terminals of the sample capacitor by means, not comprising one of the switching elements, for connecting, the measurement circuit including one of a logic gate and a voltage comparator; and
  a controller for operating the three switching elements so that at any time at least one of the three switching elements is in its respective closed state,
  wherein:
  a first of the three switching elements connects the drive electrode to a first reference voltage when in its closed state and disconnects the drive electrode from the first reference voltage when in its open state;
  a second of the three switching elements connects the drive electrode to a second reference voltage when in its closed state and disconnects the drive electrode from the second reference voltage when in its open state; and
  the third of the three switching elements connects the distal terminal of the sample capacitor to a third reference voltage when in its closed state and disconnects the distal terminal from the third reference voltage when in its open state.

27. A method for measuring a capacitance between a first electrode and at least one second electrode comprising:
  applying a series of switch-controlled voltage pulses to the first electrode;
  accumulating from the second electrode a first signal representative of charge over a plurality of switch-controlled charging cycles during which fixed frequency negative voltage transitions are applied to the first electrode; and
  accumulating from the second electrode a second signal representative of charge over a plurality of switch-controlled discharging cycles during which fixed frequency positive voltage transitions are applied to the first electrode; and
  using the accumulated. first and second signals to determine a value representative of the capacitance between the first electrode and the second electrode.

28. The method of claim 27, further comprising:
  applying a series of switch-controlled voltage pulses to the second electrode;
  accumulating from the first electrode a third signal representative of charge over a plurality of switch-controlled, charging cycles during which fixed frequency negative voltage transitions are applied to the second electrode; and
  accumulating from the first electrode a third signal representative of charge over a plurality of switch-controlled discharging, cycles during which fixed frequency positive voltage transitions are applied to the second electrode; and
  using the accumulated third and fourth signals to determine a value representative of the capacitance between the first electrode and the second electrode.

29. A device for measuring capacitance between a drive electrode and a receive electrode comprising:
  two or more switches having open and closed states and configured so that a first configuration of open and closed states of the two or more switches applies positive voltage to the drive electrode, and a second configuration of open and closed states of the two or more switches applies a fixed frequency negative voltage to the drive electrode;

control circuitry configured to control the two or more switches;

one or more signal accumulators disposed to accumulate a first signal representative of the capacitance to he measured during charging, of the receive electrode under the first configuration of open and closed, states, and to accumulate a second signal representative of the capacitance to he measured during discharging of the receive electrode under the second configuration of open and closed states; and measuring circuitry configured to determine a value indicative of the capacitance to be measured using the accumulated first signal and the accumulated second signal.

30. A method of capacitively sensing the presence and location of a body proximate a touch-sensitive device having a first electrode array and a second electrode array where each array has capacitance to ground and inter-array capacitance, comprising:

applying a series of switch-controlled voltage pulses to at least one electrode of the first array;

measuring from at least one electrode of the second array a first signal representative of capacitance of at least one electrode of the second array;

determining which electrodes of the second array are proximate a body based on the first signal;

applying a series of switch-controlled voltage pulses to at least one electrode of the second array;

measuring from at least one electrode of the first array a second signal representative of capacitance of at least one electrode of the first array; and determining which electrodes of the first array are proximate a body based on the second signal.

31. A non-transitory storage medium containing computer-executed instructions that when executed by a computer in conjunction with a touch-sensitive device having a first electrode array and a second electrode array where each array has capacitance to ground. and inter-array capacitance, causes the following steps to he performed:

applying a series of switch-controlled voltage pulses to at least one electrode of the first array;

measuring from at least One electrode of the second array a first signal representative of capacitance of at least one electrode of the second array;

determining which electrodes of the second. array are proximate a body based on the first signal;

applying a series of switch-controlled voltage pulses to at least one electrode of the second array; and measuring from at least one electrode of the first array a second signal representative of capacitance of least one electrode of the first array; and determining which electrodes of the first array are proximate a body based on the second signal.

32. An apparatus for measuring a parameter related to capacitance between a drive electrode and a receive electrode of a touch sensitive device, the apparatus comprising:

an accumulator capacitor coupled at one end to a voltage measurement circuit and at the other end to the receive electrode;

control circuitry configured and arranged, during each cycle of a measurement sequence. to connect a reference voltage to a first node that electrically connects the accumulator capacitor to the voltage measurement circuit;

a discharge circuit configured and arranged to draw current from a second node electrically connected to the accumulator capacitor and to the receive electrode during the measurement sequence; and, wherein the control circuitry is further configured to connect the reference voltage to the first node during one of negative or positive transitions of a voltage that drives the drive electrode, a transition of the voltage that drives the drive electrode occurring when the reference voltage is connected to the first node.

33. An apparatus for measuring a parameter related to capacitance between a drive electrode and a receive electrode of a touch sensitive device, the apparatus comprising:

an accumulator capacitor coupled at one end to a voltage measurement circuit and at the other end to the receive electrode:

control circuitry configured and arranged, during each cycle of a measurement sequence, to connect a reference voltage to a first node that electrically connects the accumulator capacitor to the voltage measurement circuit;

a discharge circuit configured and arranged to draw current from a second node electrically connected to the accumulator capacitor and to the receive electrode during the measurement sequence ; and, drive circuitry configured and arranged to generate an AC wave to drive the drive electrode, and wherein the cycles of the AC wave correspond to the cycles of the measurement sequence and the control circuitry is further configured to connect the reference voltage to the first node during negative or positive transitions of the AC wave.

* * * * *

UNITED STATES PATENT AND TRADEMARK OFFICE
CERTIFICATE OF CORRECTION

PATENT NO. : 8,363,031 B2
APPLICATION NO. : 12/560545
DATED : January 29, 2013
INVENTOR(S) : Bernard Geaghan It is certified that error appears in the above-identified patent and that said Letters Patent is hereby corrected as shown below:

Title Page 2, Col. 2 (Other Publications)
Line 12, delete "amplifer>." and insert -- amplifier>. --

Line 15, delete "conferance" and insert -- Conference --

In the Specification

Column 5
Line 61, delete "Rev1-Rev4" and insert -- Rcv1-Rcv4 --

Column 6
Line 2, delete "Rev1-Rev4" and insert -- Rcv1-Rcv4 --

Line 3, delete "Rev1-Rev4" and insert -- Rcv1-Rcv4 --

Columns 11-12
Lines 59-66 (Col. 11) and lines 1-4 (Col. 12), delete "The sampling .....remains low."
and insert the same on Col. 11, line 60, below "Vref.", as a new paragraph

In the Claims

Column 20
Line 3, in claim 7, delete "during," and insert -- during --

Line 8, in claim 7, delete "circuit" and insert -- circuit. --

Signed and Sealed this
Twentieth Day of August, 2013

Teresa Stanek Rea
*Acting Director of the United States Patent and Trademark Office*

Column 20

Line 25, in claim 11, delete "claim 1" and insert -- claim 1, --

Line 30, in claim 12, delete "electrode," and insert -- electrode --

Line 66, in claim 18, delete "modulatton-circuit" and insert -- modulation-circuit --

Column 21

Line 1, in claim 19, delete "cireuit" and insert -- circuit --

Line 20, in claim 20, delete "electric," and insert -- electric --

Line 24, in claim 20, delete "second." and insert -- second --

Line 28, in claim 20, delete "h)," and insert -- b), --

Line 31, in claim 20, delete "threshold," and insert -- threshold --

Line 32, in claim 20, delete "steps h)" and insert -- steps b) --

Line 38, in claim 21, delete "13)," and insert -- b), --

Line 41, in claim 22, delete "h)" and insert -- b) --

Line 41, in claim 22, delete "as" and insert -- a --

Line 61, in claim 26, delete "stale" and insert -- state --

Line 64, in claim 26, delete "Lo" and insert -- to --

Column 22

Line 40, in claim 27, delete "accumulated." and insert -- accumulated --

Line 47, in claim 28, delete "switch-controlled," and insert -- switch-controlled --